(12) United States Patent
Ghovanloo et al.

(10) Patent No.: US 9,911,358 B2
(45) Date of Patent: Mar. 6, 2018

(54) WIRELESS REAL-TIME TONGUE TRACKING FOR SPEECH IMPAIRMENT DIAGNOSIS, SPEECH THERAPY WITH AUDIOVISUAL BIOFEEDBACK, AND SILENT SPEECH INTERFACES

(71) Applicant: Georgia Tech Research Corporation, Atlanta, GA (US)

(72) Inventors: Maysam Ghovanloo, Atlanta, GA (US); Jacob Block, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 300 days.

(21) Appl. No.: 14/281,794

(22) Filed: May 19, 2014

(65) Prior Publication Data
US 2014/0342324 A1 Nov. 20, 2014

Related U.S. Application Data

(60) Provisional application No. 61/825,279, filed on May 20, 2013.

(51) Int. Cl.
G09B 19/04 (2006.01)
G09B 5/06 (2006.01)

(52) U.S. Cl.
CPC ............ *G09B 19/04* (2013.01); *G09B 5/06* (2013.01)

(58) Field of Classification Search
CPC ..................................................... G09B 19/04
See application file for complete search history.

(56) References Cited

U.S. PATENT DOCUMENTS

| | | | |
|---|---|---|---|
| 4,303,077 A | 12/1981 | Lewin et al. |
| 4,334,542 A | 6/1982 | Takinishi et al. |
| 5,457,768 A | 10/1995 | Tsuboi et al. |
| 5,460,186 A | 10/1995 | Buchhold et al. |
| 5,523,745 A | 6/1996 | Fortune et al. |
| 5,632,002 A | 5/1997 | Hashimoto et al. |
| 5,689,246 A | 11/1997 | Dordick et al. |
| 6,052,610 A | 4/2000 | Koch et al. |
| 6,263,230 B1 | 7/2001 | Haynor et al. |
| 6,311,159 B1 | 10/2001 | Van Tichelen et al. |
| 6,598,006 B1 | 7/2003 | Honda et al. |
| 6,801,231 B1 | 10/2004 | Beltz |
| 6,974,424 B2 | 12/2005 | Fletcher et al. |

(Continued)

*Primary Examiner* — Sam Yao
*Assistant Examiner* — Evan Page
(74) *Attorney, Agent, or Firm* — Troutman Sanders LLP; Ryan A. Schneider

(57) ABSTRACT

A real-time wireless system for recording natural tongue movements in the 3D oral space. By attaching a small magnetic tracer to the tongue, either temporarily or semi-permanently, and placing an array of magnetic sensors around the mouth, the tracer can be localized with sub-millimeter precision. The system can also combine the tracer localization with acoustic, video, and flow data via additional sensors to form a comprehensive audiovisual biofeedback mechanism for diagnosing speech impairments and improving speech therapy. Additionally, the system can record tongue trajectories and create an indexed library of such traces. The indexed library can be used as a tongue tracking silent speech interface. The library can synthesize words, phrases, or execute commands tied to the individual patterns of magnetic field variations or tongue trajectories.

16 Claims, 23 Drawing Sheets

(56) References Cited

U.S. PATENT DOCUMENTS

| | | |
|---|---|---|
| 6,978,639 B2 | 12/2005 | Underwood |
| 7,071,844 B1 | 7/2006 | Moise |
| 7,096,148 B2 | 8/2006 | Anderson et al. |
| 7,353,134 B2 | 4/2008 | Cirielli |
| 8,044,766 B2 | 10/2011 | Ghovanloo et al. |
| 8,374,876 B2 | 2/2013 | Black et al. |
| 2006/0004567 A1* | 1/2006 | Russell .................... G09B 5/06 704/209 |
| 2010/0007512 A1* | 1/2010 | Ghovanloo ............. G06F 3/011 340/4.11 |
| 2010/0060472 A1 | 3/2010 | Kimura et al. |
| 2010/0131268 A1 | 5/2010 | Moeller |
| 2010/0235170 A1 | 9/2010 | Rothenberg |
| 2012/0271639 A1 | 10/2012 | Hanson |
| 2013/0090931 A1* | 4/2013 | Ghovanloo ............. G06F 3/011 704/275 |

\* cited by examiner

WIRELESS REAL-TIME TONGUE TRACKING FOR SPEECH IMPAIRMENT DIAGNOSIS, SPEECH THERAPY WITH AUDIOVISUAL BIOFEEDBACK, AND SILENT SPEECH INTERFACES

CROSS-REFERENCE TO RELATED APPLICATIONS

This application claims the benefit under 35 U.S.C. § 119(e) of U.S. Provisional Patent Application Ser. No. 61/825,279, filed 20 May 2013, the entire contents and substance of which is incorporated herein by reference in its entirety.

STATEMENT REGARDING FEDERALLY SPONSORED RESEARCH OR DEVELOPMENT

This invention was made with government support under grants IIS-0803184 and IIS-0953107, awarded by the National Science Foundation and grant RC1-EB010915-01, awarded by the National Institutes of Health. The federal government has certain rights in the invention.

BACKGROUND

The present invention generally relates to the field of speech and language impairments, speech therapy, and augmentative and alternative communication (AAC) interfaces. Embodiments of the present invention relate to an apparatus for real-time wireless tracking of a subject's tongue during speech by systems and methods of using the apparatus. More particularly, embodiments of the present invention relate to an apparatus for real-time tracking of a subject's tongue during speech by way of a tracer unit carried by the tongue of a subject and a plurality of sensors for detecting at least one position and/or orientation of the tracer in real time, such that movements of the tongue by the subject during speech may be continuously tracked and displayed directly for review or embedded indirectly in a game-like environment to further motivate the subject to improve the subject's speech.

Embodiments of the present invention can comprise a multi-functional, scalable tongue tracking system (TTS) that can continuously and wirelessly track the tongue's position in real time and use that information, for example and not limitation, to measure, guide, create, and improve speech. The TTS can provide the user with, for example, audiovisual biofeedback through displaying three dimensional (3D) tongue movements or derivatives of such movements as well as audible speech/non-speech waveforms, or tactile vibrations on the skin, enabling fluid real-time interaction between the end-user (patient), the therapist, and the system. The TTS can also be used as a silent speech interface by using the acoustic-kinematic recordings of a subject who may have a voice disorder, for example, to automatically build, index, and reproduce speech from a database of phonemes, words, phrases, and commands based on that user's specific acoustic-kinematic recordings.

Speech is a complex and intricately timed task that requires the coordination of numerous muscle groups and physiological systems. While most children acquire speech with relative ease, it is one of the most complex of all patterned movements accomplished by humans, and thus susceptible to impairment. Additionally, the ability to communicate is one of the most important requirements of independent living and a key factor in the quality of life.[1]

This motivates the development of both novel speech impairment diagnostic and therapy systems, and new alternative and augmentative communication (AAC) methods.

Speech and language therapy has a long history that includes many different technologies and techniques for both experimental and clinical settings. Traditional speech intervention relies on a trained speech and language pathologist (SLP) providing directive feedback to the patient about proper placement of the articulators and manner of articulation.[2] Common elements of speech therapy can include repeated practice, visual feedback via a mirror, and mimicking the clinician's accurate production. While these practices are generally effective for readily viewable speech sounds (visemes, such as /b/p/m/, any of several speech sounds which looks the same on the face when produced), they are often largely unsuccessful for sounds produced inside the mouth. Each viseme can be representative of more than one phoneme, which can be produced by the same mouth posture. The TTS system can allow clinicians to easily demonstrate the subtle differences between phonemes beyond what the viseme presents. Words such as pet, bell, and men can often be difficult to distinguish, as all look alike. However, there can be differences in timing and tongue gesture in terms of representing a visual signature of a given phoneme. A major benefit of the TTS system is to clarify and enhance these visual differences even when they are completely hidden inside the mouth.

The tongue is the primary articulator for these obstructed sounds and its movements within the mouth can be difficult to capture. Thus, clinicians often use diagrams and other low-tech means (i.e., placing edible substances on the palate, physically manipulating the oral articulators, etc.) to show clients where to place their tongues in order to produce obstructed sounds. While sophisticated research tools exist to measure and track tongue movements during speech (e.g., electromagnetic articulography and electropalatography), they can be expensive, obtrusive, and impractical for widespread clinical use. Moreover, considering that the therapy sessions fill only a fraction of the patients' weekly or monthly routines, a clinician-supervised means for practicing speech are generally not available to the patients in their home and work environments, where they spend the majority of their time.

For people with voice disorders, who can have either no audible speech to correct (aphonia) such as individuals post-laryngectomy, or very weak or faint speech (dysphonia) due to, for example, old age, there are a limited number of communication modalities available. Currently, there are three possible methods for partially restoring the vocal function, each with a major limitation: A) Oesophageal speech: the sound created by swallowing air and belching. This method can be difficult to learn, and may not allow fluent speech. B) Electrolarynx: vibrates the soft tissues of the throat and creates sound, which can be articulated into speech, but the voice is hoarse and robotic, and can be difficult to understand. C) Voice prosthesis: A small silicone-based "tracheo-oesophageal" fistula speech valve that is currently the "gold standard". Although these fistula speech valves work very well initially, in many patients, they rapidly become colonized by biofilms and fail after only 3 to 4 months. Various modifications have been tried over the years to discourage biofilm growth, but to date none of them appears to provide a long-term solution for voice replacement.

A new modality that is currently under research in academia is a silent speech interface (SSI). An SSI is a device that collects data from various elements of the human speech production process (e.g., articulators, neural pathways, or the brain) using different types of sensors to detect the intended phonemes and words to produce a digital representation of speech, which can be synthesized into speech.[3] Depending on the individuals' impairments, various types of sensor and data acquisition strategies have been developed, leading to these categories:

1. Electromagnetic Articulography (EMA) sensors that capture the movement of fixed points on the articulators.[4] [5]
2. Ultrasound and optical imaging of the tongue and lips that lead to real-time characterization of the vocal tract.[6]
3. Non-audible murmur microphone for digital transformation of the signals.[7]
4. Electromagnetic and vibration sensors for analysis of glottal activity.[8]
5. Surface electromyography (sEMG) of the articulator muscles or the larynx
6. Electro-encephalography (EEG).[9]
7. Implantation of microelectrode arrays in the speech-motor cortex.[10]

Each of the above methods has its own pros and cons for clinical translation. For instance, (1) and (2) are precise but can be quite bulky and expensive; (3), (5), and (6) may not be robust and reliable enough, and usually require intensive training on the user's part; (4) only works for users who have an intact glottis; and (7) is highly invasive and may not be attractive to the majority of end users.

None of the above systems are optimized for those users who often retain a certain level of volitional tongue motion, but suffer from the absence or weakness of their voices. This group can include, for example and not limitation, individuals who have undergone a laryngectomy, older citizens who require a substantial effort for speaking with normal tone, and people who have paralyzed articulators (e.g., vocal fold paresis/paralysis), yet have retained sufficient tongue motion, e.g. certain types of cerebral palsy, stroke, and early stages of amyotrophic lateral sclerosis (ALS). Other potential users are those who have temporarily or permanently lost their voices due to various reasons, for example and not limitation, infections, gastro-esophageal reflux disease (GERD), laryngopharyngeal reflux, spasmodic dysphonia, abnormal growths due to a virus or cancer, and diseases that paralyze the vocal folds. This group is a major population that can significantly benefit from a wireless and wearable SSI system at a reasonable cost.

Users of the TTS and associated software and systems can be SLP practitioners and speech-language researchers. These groups have distinct requirements that can be met by different TTS implementations. Additionally, there are good indicators that the entire speech pathology industry and associated markets are growing at a rapid pace. As the large "baby-boom" population grows older, there will likely be further increases in instances of health conditions that can cause speech or language impairments, such as stroke and hearing loss. In addition, new federal laws guarantee special education and similar services to all children with disabilities. The increase in awareness of speech and language disorders may correspond to an increase in awareness about effective treatment modalities. Other sources of user demand for such a technology include medical advancements that improve premature infant survival rate, victims of stroke, and traumatic brain injuries (TBI), many of whom need help from SLPs. The number of SLPs in private practice is also rising due to an increase in the use of contract services by hospitals, schools, and nursing care facilities.

What is needed, therefore, is a system that can unobtrusively and continuously track the subject's tongue movement and position in real time during speech and use that information, for example and not limitation, to measure, guide, and create speech. The system should take advantage of a plurality of highly precise sensors to precisely track the tongue's movement and position, and translate that information into a format that can be graphically and easily understood by the user, such as a SLP, speech-language researcher, or subject. For example and not limitation, the graphical representation of the user's tongue movement and position can be audiovisual, and can be used to provide biofeedback to the subject and/or user. Yet another major benefit of the TTS system, thanks to the quantitative and software-defined nature of its outputs, is that it can log, analyze, demonstrate and report the patients' progress in improving their speech over the course of the therapy. This can indicate to the SLP whether a certain type of therapy or exercise is working or no. It can also provide the healthcare providers, insurance companies, and reimbursement mechanisms with a much more accurate and objective measure of their clients' and clinicians' performance. It is to such a system that embodiments of the present invention are primarily directed.

SUMMARY

Briefly described, in preferred form, the present invention comprises an assistive system and method for wirelessly tracking a subject's tongue in real-time and in 3D during speech. In some embodiments, the system and method can comprise a tracer unit adapted for non-obstructive affixation to the tongue of the subject, such that a change in position of the tongue changes the position of the tracer; a plurality of sensors for detecting a position of the tracer unit and adapted for non-obstructive placement proximal to the tracer unit; and a sensor control unit for transmitting a sensor signal to a computing platform based on the detected position of the tracer unit.

In some embodiments of the present invention, the sensor control unit processes the sensor signal from an analog signal to a digital signal. In some embodiments of the present invention, the sensor control unit comprises a wireless transmitter for transmitting the sensor signal by wireless communication. In some embodiments, there can be a plurality of sensor control units.

In some embodiments of the present invention, the Tongue Tracking System (TTS) can comprise a system and method that can, for example and not limitation, be used to diagnose speech and language impairments, generate audiovisual biofeedback for speech therapy, and as a communication means for silent speech interfacing. In other embodiments, the TTS system and method can be used by healthy individuals who want to learn a foreign language while minimizing their accent. In some embodiments, the TTS system and method can precisely localize the 3D trajectories of a tracer inside a space, such as for example and not limitation, a user's mouth, surrounded by an array of sensors or a plurality of sensors. In these embodiments, the array or plurality of sensors can be arranged around the mouth near the user's cheeks, and a small tracing unit can be attached to a desired spot on the tongue, such that the TTS system and method can track the trajectory of the desired spot on the tongue during, for example and not limitation, speech or tongue exercise within the user's oral space.

In some embodiments of the present invention, the TTS system and method can process the tracking information and can provide post-processed data that can include, for example and not limitation, the position and orientation of the magnetic tracer inside the mouth. In some embodiments, depending on the graphical user interface (GUI) design, the TTS system can, for example and not limitation, display this post-processed data on a computer screen and/or play it in the speakers to create a rich audiovisual biofeedback. In such embodiments, the simplest representation of the post-processed data can consist of, for example and not limitation, a single marker, which can represent the tracking unit, moving inside a 3D space, which can represent the user's mouth, or as a 3D trajectory of the tracking unit within the 3D space by keeping a trail of a few most recent locations of the tracking unit on the screen.

In some embodiments of the present invention, the tracer unit can comprise a magnet, which in some embodiments can be a permanent magnet exhibiting straight-line normal demagnetization curve properties. In some embodiments, the magnet can comprise a flexible magnet, a rare earth magnet (e.g., a neodymium-iron-boron magnet or a samarium-cobalt magnet) or a ceramic magnet. In some embodiments, the method can comprise a post adapted for piercing the tongue to which the tracer unit is attached. In other embodiments, the tracer unit can be adapted for affixation to the tongue by embedding or implanting the tracer unit within the tongue. In other embodiments, the tracer unit can be adapted for affixation to the tongue by a tissue adhesive or dental adhesive. In some embodiments, the tracer unit can be adapted for semi-permanent affixation to the tongue via a magnet containing tongue piercing, tongue jewelry, or tongue ring. In some embodiments, the tracer unit can be encased within a biocompatible material (e.g., gold, platinum, titanium, a ceramic, a polymeric material, or combinations thereof).

In some embodiments of the present invention, at least one sensor can be adapted for incorporation into a dental fixture fitted into the mouth of the subject. In other embodiments, at least one sensor can be adapted for positioning outside the mouth of the subject. In some embodiments, at least one sensor is a plurality of sensors and the method comprises a controller for controlling power distribution to the plurality of sensors. In some embodiments, at least one sensor is a magnetometer, a Hall-effect magnetic sensor, a magnetoinductive sensor, a flux-gate, or a magnetoresistive sensor. In some embodiments, the sensor can be a plurality or array of sensors positioned outside the subject's mouth. In some embodiments, the sensor can comprise an array of magnetic field sensors or magnetometers that are capable of detecting 3D magnetic fields.

The TTS system and method is adaptable and, in some embodiments, can include additional sensors for multiple applications. In some embodiments, the TTS system and method can be integrated with, for example and not limitation, microphones, accelerometers, gyroscopes, miniature CMOS cameras, and flow and/or pressure sensors, as well as electropalatography, electromyography (EMG) and electroencephalography (EEG) electrode arrays for detecting tongue contact with the palate, muscle movement and/or activity, and brain activity.

In some embodiments of the present invention, the system and method can comprise a computing platform for receiving the sensor signal from the sensor control unit, translating and processing the sensor signal to obtain 1D, 2D, or 3D tracking information from the tracer unit, generating, for example and not limitation, a 1D, 2D, or 3D graphical and/or audiovisual representation of the tracking information, and displaying the graphical and/or audiovisual representation on the graphical interface of the computing platform or a graphical display for review by the SLP, clinician, or tutor. In some embodiments, the graphical and/or audiovisual representation can comprise, for example and not limitation, a tracing, line drawing, or 3D drawing of the tongue movement and position based on the movement of the tracer unit during speech. In other embodiments, the graphical and/or audiovisual representation can comprise biofeedback, such as for example and not limitation, audiovisual, tactile, and/or vibrotactile biofeedback. In other embodiments, the graphical and/or audiovisual representation can comprise a change in the color or position of an object on the screen, the pitch or amplitude of a tone, or a combination of these. In some embodiments, the biofeedback can be generated by a tongue tracking and signal processing algorithm. In other embodiments, the graphical and/or audiovisual representation can be embedded in an engaging and goal-oriented computer game that becomes gradually harder to encourage users to continue practicing and try to perform better.

In some embodiments, the computing platform can receive the sensor signal by way of a receiver or receiver unit, which can be a wireless receiver. In some embodiments, there can be a single receiver unit; in other embodiments, there can be a plurality of receiver units. In some embodiments, the plurality of sensor control units can communicate with a plurality of receivers. In some embodiments, the plurality of sensor control units can communicate with at least one receiver unit. In some embodiments, the communication between the sensor control unit and the receiver unit can be wireless, such as for example and not limitation, WiFi or Bluteooth. In some embodiments, the communication between the sensor control unit and the receiver unit can be wired, such as for example and not limitation, via Ethernet. In some embodiments, the communication between the sensor control unit and the receiver unit can occur via direct connection, such as for example and not limitation, USB or similar computer cable and/or connection.

In some embodiments, the sensor unit or plurality of sensor units can have a control functionality provided by a separate control unit, such as for example and not limitation, a high-speed field programmable gate array (FPGA) controller. The sensor unit or plurality of sensor units can communicate with the FPGA controller via wired or wireless connection or direct connection, such as for example and not limitation, USB, Ethernet, Bluetooth, WiFi, or similar computer cable and/or connection. The FPGA controller can communicate with the either the computing platform or a receiver unit via wired or wireless connection or direct connection, such as for example and not limitation, USB, Ethernet, Bluetooth, WiFi, or similar computer cable and/or connection. The receiver unit can then communicate with the computing platform via wired or wireless connection or direct connection, such as for example and not limitation, USB, Ethernet, Bluetooth, WiFi, or similar computer cable and/or connection.

In some embodiments, the computing platform can receive the sensor signal via wireless connection, wired connection, or direct connection via USB, Ethernet, Bluetooth, WiFi, or similar computer cable and/or connection from the receiver or receiver unit. In some embodiments, the computing platform can receive the sensor signal from the receiver via a wireless connection. In some embodiments, the computing platform can comprise the graphical display and in other embodiments, the graphical display can be separate from the computing platform. In some embodiments, the graphical display can be, for example and not limitation, a computer, smartphone, tablet, or television screen or monitor. The graphical display can be connected to the computing platform via wired or wireless connection or direct connection, such as for example and not limitation, USB, Ethernet, Bluetooth, WiFi, or similar computer cable and/or connection.

In some embodiments, a method for tracking a subject's tongue movement and position is provided. The method can comprise positioning in the mouth of a subject a tracer unit non-obstructively carried by the tongue, such that a change in position or gesture of the tongue changes the position or orientation of the tracer unit; detecting the position and orientation of the tracer unit; generating a sensor signal and tracking information based on the detected position and orientation of the tracer unit; and transmitting the sensor signal and tracking information to a computing platform, wherein the computer program processes the received data into a graphical representation, such as for example and not limitation, a tracing, line drawing, or 3D drawing.

In some embodiments of the present invention, a method for tracking movement and/or position and/or orientation (or all three) of a tongue in a subject is provided. In some embodiments, the method can comprise providing in the mouth of a subject a tracer unit non-obstructively carried by the tongue such that a change in position or gesture of the tongue changes position or orientation of the tracer unit; detecting the position and/or orientation and/or movement of the tracer unit; generating a signal based on the detected position and/or orientation and/or and movement (such as, for example and not limitation, during production of a certain sound, word, or phrase) of the tracer unit; and analyzing the signal to thereby track movement and/or position and/or orientation (or all three) of any desired spot on the tongue in real-time. In some embodiments, the movement and/or position and/or orientation (or all three) of the tongue can be tracked, recorded, and represented in, for example and not limitation, 3D.

In some embodiments, the method can further comprise transmitting the signal to a computing platform, wherein the computing platform can process and analyze the signal. In some embodiments, the method can comprise repeating each of the certain sounds, words, and/or phrases a desired number of times to track tongue movement and/or position and/or orientation over a time period to generate a tongue movement pattern for that sound, word, and/or phrase. Further, in some embodiments, the method can comprise comparing the tongue movement pattern to a normal tongue movement pattern, which can be provided by a SLP, clinician, or tutor, as part of a speech analysis program, a speech therapy program, or both. In some embodiments, the method can further comprise of the computer calculating the difference between the target tongue movement pattern (normal pattern generated by the SLP, clinician, or tutor) and the subject's tongue movement pattern.

In some embodiments, the method can comprise a series of rapid speech-based movements at a given location in the oral cavity, for example movement to the alveolar ridge for silent production of the following consonant-vowel combinations; /la/ /la/ /la/; /ta/ /ta/ /ta/, or on the basis of a sustained contact at a given location in the silent production of the continuant /n/ or fricative, /s/. In some embodiments of the method, an assistive method disclosed herein is utilized for tracking movement and/or position of the tongue.

In some embodiments, the array or plurality of sensors can be charged and powered by an inductive power transfer system, wherein the need for primary batteries is reduced, or better yet, eliminated. In some embodiments, a calibration system and method for calibrating the array or plurality of sensors relative to the tracer unit is provided. In some embodiments, a system and method for training the sensor system for interpreting movements of the tongue in particular speech patterns is provided.

These and other objects, features, and advantages of the tongue tracking system (TTS) and method will become more apparent upon reading the following specification in conjunction with the accompanying drawing figures.

DETAILED DESCRIPTION OF PREFERRED EMBODIMENTS

Figure 1:
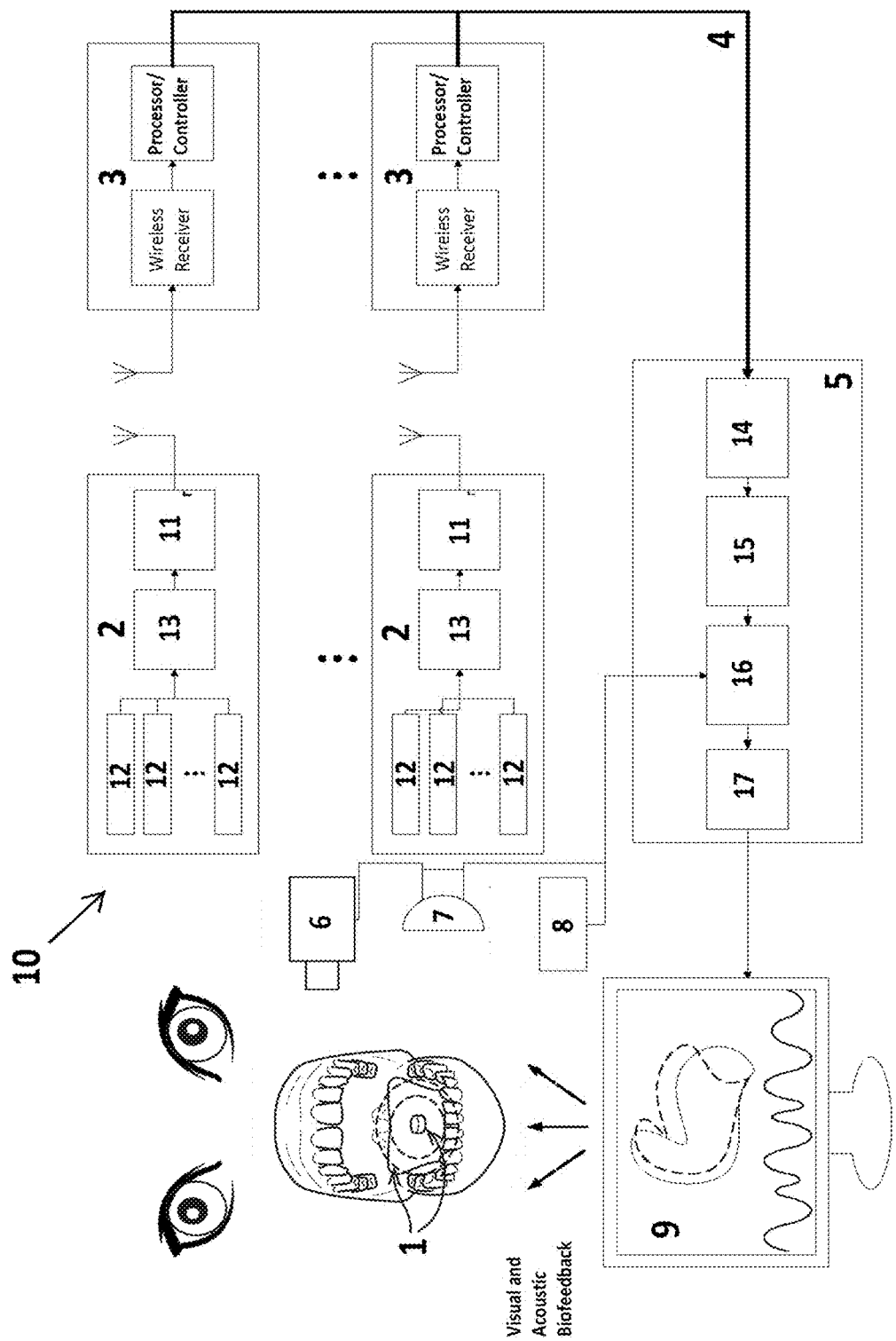
FIG. 1 is a block diagram for an embodiment of a wireless TTS system and apparatus. The system and apparatus can include a scalable number of wireless sensor control units with magnetic field sensors, a processor, and a wireless transmitter.

To facilitate an understanding of the principles and features of the various embodiments of the present invention, various illustrative embodiments are explained below. Although exemplary embodiments of the present invention are explained in detail, it is to be understood that other embodiments are contemplated. Accordingly, it is not intended that the present invention is limited in its scope to the details of construction and arrangement of components set forth in the following description or examples. The present invention is capable of other embodiments and of being practiced or carried out in various ways. Also, in describing the exemplary embodiments, specific terminology will be resorted to for the sake of clarity.

It must also be noted that, as used in the specification and the appended claims, the singular forms "a," "an" and "the" include plural references unless the context clearly dictates otherwise. For example, reference to a component is intended also to include composition of a plurality of components. References to a composition containing "a" constituent is intended to include other constituents in addition to the one named.

Also, in describing the exemplary embodiments, terminology will be resorted to for the sake of clarity. It is intended that each term contemplates its broadest meaning as understood by those skilled in the art and includes all technical equivalents that operate in a similar manner to accomplish a similar purpose.

Ranges may be expressed herein as from "about" or "approximately" or "substantially" one particular value and/or to "about" or "approximately" or "substantially" another particular value. When such a range is expressed, other exemplary embodiments include from the one particular value and/or to the other particular value.

Similarly, as used herein, "substantially free" of something, or "substantially pure", and like characterizations, can include both being "at least substantially free" of something, or "at least substantially pure", and being "completely free" of something, or "completely pure".

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a composition does not preclude the presence of additional components than those expressly identified.

The materials described as making up the various elements of the present invention are intended to be illustrative and not restrictive. Many suitable materials that would perform the same or a similar function as the materials described herein are intended to be embraced within the scope of the present invention. Such other materials not described herein can include, but are not limited to, for example, materials that are developed after the time of the development of the present invention.

To facilitate an understanding of embodiments, principles, and features of the present invention, they are explained hereinafter with reference to implementation in illustrative embodiments in the context of being a system and apparatus for tracking the movement of a subject's tongue during speech in real-time and optionally in 3D by way of a tracer unit carried by the tongue of a subject.

Embodiments of the present invention, however, are not limited to use in the described systems. One skilled in the art will recognize that the invention is not so limited. Rather, embodiments of the present invention can be used when a system for tracking the movement of a subject's tongue during speech is desired or needed. Thus, the system described hereinafter as a tracking system can also find utility as a system for many applications beyond assistive technologies, including but not limited to an augmentative and alternative communication (AAC) system, audiovisual gaming system, voiced and silent speech recognition system, speech translation system, universal communication system, tongue gesture recognition and recording system, rehabilitation system, environmental controlling system, and/or a new language training system.

Exemplary embodiments of the present disclosure relate to a system and apparatus for tracking the movement of a subject's tongue during speech. Methods for using the system and apparatus to provide graphical representations of the tongue movement and for tracking tongue movement during speech are further provided.

Definitions

The following terms are defined as follows herein:

"Appliance", as used herein, refers to an instrument or device designed for a particular or general use or function. An appliance can be, but is not limited to a personal computer, a powered wheelchair, a motorized bed, a telephone, a home appliance, and a speech synthesizer.

"Magnetic field strength" (H, Units: Oersted) (also known as magnetizing or demagnetizing force), refers to the measure of the vector magnetic quantity that determines the ability of an electric current, or a magnetic body, to induce a magnetic field at a given point.

"Magnetic induction" (B, Units: Gauss) refers to the magnetic field induced by a field strength, H, at a given point. It is the vector sum (at each point within the substance) of the magnetic field strength and resultant intrinsic induction. Magnetic induction is the flux per unit area normal to the direction of the magnetic path. Therefore, it is also called magnetic flux density.

"Hysteresis loop" refers to a closed curve obtained for a material by plotting (usually in rectangular coordinates) corresponding values of magnetic induction, B, for ordinate and magnetizing force, H, for abscissa when the material is passing through a complete cycle between definite limits of either magnetizing force, H, or magnetic induction, B.

A "demagnetization curve" is the second (or fourth) quadrant of a major hysteresis loop. Points on this curve are designated by the coordinates $B_d$ (remnant induction) and $H_d$ (remnant field).

"Remnant induction" ($B_d$, Units: Gauss) refers to any magnetic induction that remains in a magnetic material after removal of an applied saturating magnetic field, $H_s$. ($B_d$ is the magnetic induction at any point on the demagnetization curve).

"Remnant field" ($H_d$, Units: Oersteds) refers to the value of H corresponding to the remnant induction, $B_d$ on the demagnetization curve.

"Energy product" ($B_d H_d$, Units: Megagauss-Oersteds (MGOe)) refers to the energy that a magnetic material can supply to an external magnetic circuit when operating at any point on its demagnetization curve.

In some embodiments of the present invention, an assistive system and apparatus for tracking a subject's tongue in real-time and in 3D during speech is provided. In some embodiments, the system and apparatus can comprise a tracer unit adapted for non-obstructive affixation to the tongue of the subject, such that a change in position of the tongue changes the position and/or orientation of the tracer; a plurality of sensors for detecting a position and/or orientation and/or movement of the tracer unit and adapted for non-obstructive placement proximal to the tracer unit; and a sensor control unit for transmitting a sensor signal to a computing platform based on the detected position of the tracer unit.

In some embodiments of the present invention, the TTS system can enable a new modality in speech and language therapy that can allow users, for example and not limitation, to see the motion of the most important articulatory organ, i.e. the tongue, and to visualize their speech in real-time. In some embodiments, the system can allow a SLP, for example, to mark, enhance, or otherwise augment the computer display (the audiovisual feedback) with, for example, targets, paths, and goals for treatment and/or therapeutic purposes. In other embodiments, a healthy individual who wants to learn a foreign language with a reduced accent, can use the TTS system and apparatus, for example and not limitation, to observe and compare his tongue trajectories while uttering a phoneme, word, or sentence in the foreign language with that of his tutor or a native speaker.

In some embodiments of the present invention, the system and apparatus can comprise additional sensors, such as for example and not limitation, sensors for sound recording and lip tracking/lip gestures via, for example and not limitation, microphones and cameras, respectively. Output from these additional sensors can be used by some embodiments of the system to create, for example and not limitation, multiple layers of audiovisual, tactile or vibrotactile biofeedback, all of which can contribute to the therapy and the user's rate of progress as determined by the SLP or other clinician. In some embodiments, as the user's tongue is tracked, he can see both his own tongue movements as well as the clinician's and/or tutor's input, which can be generated from the data collected from a similar TTS device that tracks the clinician's/tutor's tongue motion as a reference trajectory. In such embodiments, repetition of certain sounds, words, and/or phrases can enable the user to engage with the therapy or training for rapid improvements, not only in the presence of the SLP and/or tutor during the limited time in each therapy/training session, but also outside of the SLP and/or tutor's office, such as for example and not limitation, in his home and/or office, so that he can continue practicing and improving independently.

In some embodiments of the present invention, an array or plurality of sensors, such as for example and not limitation, magnetometers can be distributed around the tracking region of interest (ROI). The arrangement of magnetometers influences the localization accuracy and is dependent on the ROI. Once the magnetic tracer unit, which can be a small magnet in some embodiments of the present invention, is added to the ROI (e.g., the user's mouth), the magnetic field can be measured. The measurements are communicated to a pre-processor where calibration and noise reduction methods are applied.

After the preprocessing, the position and orientation of the tracer unit can be calculated using multiple methods. In some embodiments, to find the position and orientation of the tracer unit, the TTS signal processing algorithm can minimize a cost function that correlates with the difference between the measured, $B_{i,meas}$, and the estimated, $B(s_i,a,m)$, magnetic flux densities at the location of each magnetometer in the plurality of sensors using the following equation:

$$f(a, m) = \sum_{i=1}^{N} \|B_{i,meas} - B(s_i, a, m)\| \quad \text{I}$$

where $a = \langle a_x, a_y, a_z \rangle$ is the magnet's location, $m = \langle m \sin\theta \cos\phi, m \sin\theta \sin\phi, m \cos\theta \rangle$ is the tracer's orientation, and $s_i = \langle s_{ix}, s_{iy}, s_{iz} \rangle$ is the location of the $i^{th}$ magnetic sensor. The norm between the measurements, magnetic model, and sensors can include but is not limited to lp (e.g., Euclidean norm and, weighted norms, and other custom functions). The choice of norm can influence the efficiency of the cost function minimization process by the TTS signal processing algorithm, and can be dependent on the physical setup of the TTS system and apparatus. Ideally, the magnetic fields of the tracer unit follow the magnetic dipole equation:

$$B(s, a, m) = \frac{\mu_0}{4\pi} \frac{3[m \cdot (s-a)](s-a) - m\|s-a\|^2}{\|s-a\|^5}. \quad \text{II}$$

Numerical methods for minimizing the cost function by the TTS signal processing algorithm can include, but are not limited to, direct inversion, iterative methods (Nelder-Mead, Levenberg-Marquardt, Bryoden-Fletcher-Goldfarb-Shannon, particle swarm optimization, simulated annealing), Bayesian and probabilistic methods (particle filters, unscented Kalman filters), neural networks, and other numerical data analysis and machine-learning techniques. After the location and orientation of the tracer unit is determined by the TTS signal processing algorithm, additional post-processing of the tracking information can be performed by the TTS system. The post-processing techniques can form the basis for different applications of the TTS system and apparatus. In general, one or more of the following exemplary calculations, for example and not limitation, can be performed by the TTS signal processing algorithm and graphical user interface software: projecting the tongue trajectories on to 1D, 2D, or 3D displays; classification of particular locations; integration of a trajectory; integration of the difference between the target and real-time trajectories; root-mean-square error calculation between different trajectories; classification of trajectories using machine learning methods such as principal component analysis (PCA), K-nearest neighbors, support vector machines (SVM), and neural networks; guiding and scoring the real-time trajectories towards the target trajectory; pattern-matching; and calculating standard deviation or number of intersections of the real time trajectories compared to targets. The post-processing techniques can comprise, for example and not limitation, a tongue tracking and signal processing algorithm, statistical analysis to quantify performance, analyzing the timing for various tongue movements, quantifying the differences between the target and executed tongue trajectories in terms of timing, smoothness, vibrations, and frequency contents (Fourier analysis). Post processing can also combine acoustic analysis with tongue kinematics. Post processing can also provide, for example and not limitation, a correlation between the phonemes and speech sounds and the position of the tracer at a desired spot on the tongue can be analyzed and quantified. The differences between the frequency contents of the target and executed acoustic signals in combination with the tongue trajectories can be generated.

In many embodiments of the present invention, the TTS system can be computerized, allowing all therapy sessions including all the sensory inputs (such as for example and not limitation, changes in tongue position and/or orientation and/or movement, tongue kinematics, speech acoustics, video of the lips and oral motor gesture (such as for example and not limitation, lip movement and lip gestures), and air flow near the mouth) from the user to be automatically logged, digitally recorded, and precisely documented. In such embodiments, summary or detailed reports can be generated for the patient, family members, clinicians, insurance companies, and healthcare providers, which help mark and quantify the user accomplishments and progress in an objective way over the course of the therapy.

In some embodiments of the present invention, external air flow and pressure sensors can be added in front of the user for measuring the air stream in front of the mouth during speech while wearing the TTS apparatus to increase the potential of the TTS system and apparatus as a new methodology for speech and language therapy.

In some embodiments of the TTS system and apparatus, a lingual-kinematic and acoustic capture system can be used to both capture and integrate data from the tracer unit with data from sensors for sound recording and lip tracking/lip gesture tracking which can be, for example and not limitation, microphones, cameras, air flow and pressure sensors, electropalatography, electromyography (EMG) and electroencephalography (EEG) electrode arrays. The electrode array adapted for electropalatography can provide, for example and not limitation, information about the physical contacts made between the user's tongue and palate during speech; the electrode array adapted for EMG can provide, for example and not limitation, information about muscle movements made by the user during speech, and the electrode array adapted for EEG can provide, for example and not limitation, information about the user's brain activity during speech. In some embodiments, the data from the tracer unit and the data from the additional sensors can be processed, including for example and not limitation, filtering and synchronizing, for further processing. Further processing can comprise, for example and not limitation, conversion for use in a multimodal speech recognition module and/or a biofeedback module, which can comprise for example and not limitation, visual, audiovisual, and/or vibrotactile biofeedback. In some embodiments, the multimodal speech module and biofeedback module may be incorporated into an interactive game with corrective feedback. In some embodiments, the processing and conversion of the data can be performed via algorithm, such as for example and not limitation, a tongue tracking and signal processing algorithm using the machine learning and pattern recognition methods that were described earlier.

In some embodiments of the system and apparatus, a wireless intraoral tongue tracking system (iTTS) that fits into a thin, compact retainer device can add further capabilities. In some embodiments, this device can include integrated touch-sensitive pressure sensors and an embedded electrode array for touch sensing using impedance changes between a reference electrode and every other electrode or in between two or more arbiterarily selected electrodes. In such embodiments, the combination of the magnetic sensors with the surface electrode array and pressure sensors can form a wireless hybrid TTS and electropalatography system. The magnetic sensor data can be fused with additional sensor data, such as for example and not limitation, acoustic, video, touch, pressure, and flow data, in the post-processing stage of embodiments of the system, thus creating a comprehensive analytical tool for speech and language therapy and research.

Some embodiments of the TTS system and apparatus can be used as a preventative device. Speech impairment is often an early symptom of a more severe neurological impairment. The TTS system and apparatus can be used as a diagnostic tool by comparing multi-modal recordings between multiple sessions, including voice, oral motor features, and tongue kinematics. Changes to speech over time are often an informative metric for clinicians. Other potential cost-saving practices can include, for example and not limitation, remote therapy in the context of telerehabilitation. The system can be easily portable, which allows a patient to take and set it up in a convenient location in the comfort of his own home. To further lower costs, the SLP and patient can set up a rehabilitation schedule and meet virtually across the internet. The data can be streamed over the internet to the SLP in real-time and the SLP can provide feedback and adjustments to the TTS system and apparatus and the presented trajectories, markers, and goals as if they were meeting in person. Similarly, if the SLP uses a TTS system, the information can be reflected on to the patient's monitor in real-time in the form of target trajectories. The TTS system and apparatus can therefore, reduce healthcare costs as well as reduce the physical, financial, and emotional burdens on the patients, some of whom may not be in good physical shape. In some embodiments, an audio recording of the session can be made and played back at a later time by the patient. In some embodiments, the audio recording can be incorporated into biofeedback or feedback provided to the patient by the TTS system and apparatus.

The production of tongue trajectories by embodiments of the TTS system and apparatus does not necessarily require perfect and legible vocalization. Therefore, only tongue motion or magnetic signature with or without an imperfect or severely disordered voice can be sufficient to for the TTS to recognize words, phrases, and sentences. Thus, the TTS system can be an effective silent speech interface. Such embodiments are referred to as the Tongue Tracking Silent Speech Interface (TTSSI). In some embodiments, the TTSSI can be a wireless system. In some embodiments, the TTSSI can be adapted to be easily portable and/or wearable by the user. The user can train and build a library of tongue trajectories and magnetic/acoustic signatures for a corpus of mostly used words and phrases to be used in a variety of daily life scenarios. The TTSSI can create the library by, for example and not limitation, recording, synchronizing, and time-warping each or a combination of magnetic, acoustic, and/or imaging sensor signals from several utterances of a desired word or phrase to create a reference multimodal pattern and dataset for that word or phrase. The library can also be indexed by, for example and not limitation, the processed trajectories and patterns of tongue motion and/or magnetic sensor array output signals and/or microphone output signal (referred to as the magnetic/acoustic signature) for the specific words and phrases in the library. The magnetic/acoustic signature can include a plurality of signals and waveforms generated by the magnetic sensors and the microphone when the user utters a specific phrase or word. The connected data entries can be a mix of single words, entire phrases, or additional digital or analog commands. The TTSSI signal processing algorithm can also map the user's tongue trajectories or magnetic/acoustic signatures to their identical vocalized words for natural real-time speech synthesis, by using a pre-recorded voice of the user or for example and not limitation, synthesized speech using Siri, Dragon Naturally Speaking, Microsoft Speech application programming interface (API), and/or Web Speech API.

Once the user repeats the same word or phrase that is already in the library, the incoming data can be compared in real time to all the saved patterns in the library using, for example and not limitation, pattern recognition and machine learning methods to find the best match. If the best match is found, the TTSSI can synthesize the voice and can speak the desired word or phrase for the user. If there is not a clear best match, the TTSSI can show the top three matches that have correlations higher than a certain threshold to the user on the computer or smartphone screen for the use to choose from before synthesizing the selected word or phrase. If no match above the threshold is found, the TTSSI can simply ask the user to repeat the word or sentence.

Other examples include converting tongue trajectories to text and controls, such as for example and not limitation, a mouse, remote control, and/or wheelchair. The tongue trajectory library can be initially created customized to the user and his specific communication needs (speaker-dependent). However, after collecting a large amount of data from a large population of users, it may be possible to use machine learning algorithms, such as for example and not limitation, Hidden Markov Models (HMMs), to generalize the tongue trajectories and reduce the need for customized speaker-dependent learning.

In some embodiments, the TTS system and apparatus can track a user's tongue characteristic during speech. The tongue characteristic can include, for example and not limitation, one or more of a position of the tracer unit, an orientation of the tracer unit, a sound produced by the user, an air flow produced by the user, a lip movement/gesture produced by the user, a physical contact between the tongue and a palate of the user, a muscle movement produced by the user, and/or an electrical activity of a brain of the user. The TTS system and apparatus can track one or more tongue characteristics and can utilize them in any of the embodiments of the systems and methods of using such systems as described herein. The tongue characteristic(s) can be represented in a graphical representation, such as for example and not limitation, a tracing, line drawing, or 3D drawing. In some embodiments, the graphical representation can be accompanied by an audio recording. In some embodiments, the graphical representation can incorporate biofeedback, for example and not limitation, visual, audiovisual, and/or vibrotactile feedback. In some embodiments, the biofeedback can be presented to the user in the form of an interactive game. In some embodiments of the present invention, an algorithm such as for example and not limitation, a tongue tracking and signal processing algorithm, can be used by the computer to generate the graphical representation.

The present invention includes multiple system designs for the TTS. A first system design embodiment can be a wireless, wearable design for long-term use on the go. In this embodiment, the magnetic sensors can communicate with a local processor before being wirelessly transmitted to a central receiver. The receiver can pass the data to a computing device for processing the magnetic sensor data and post-processing the fused localization data and additional sensor data. In this first embodiment, the system can be attached to the person via a headset or other peripheral. Multiple sensor control units can connect to one or more receivers, allowing for satisfying variable bandwidth requirements. In this first embodiment, the wireless setup can use, for example and not limitation, either a microcontroller or a low-power FPGA for different sampling requirements. Additional sensors in this embodiment can include, for example and not limitation, one or more embedded microphones, air flow and air pressure sensors in front of the mouth, and/or one or more cameras for lip reading and/or lip gesture detection.

Another design embodiment can include a high sensor-density TTS system (which can comprise, for example and not limitation, as many as 64 to 128 magnetometers), mounted on a wired base-station. This design embodiment can be used for diagnosis and therapeutic applications. Greater localization accuracy and sampling rates can be achieved with this embodiment by using wired communication, for example, with sensors being read in parallel from a high-speed FPGA. Additional sensors in this second embodiment can include, for example and not limitation, embedded microphones, air flow and air pressure sensors, and cameras. The wired setup as provided in this embodiment can communicate over networks to enable remote therapy.

Another design embodiment can comprise a wireless intraoral TTS (iTTS). This embodiment can be available to users who prefer wearing the TTS securely in the mouth in place of the headset. The iTTS embodiment can also be used for specialized therapy where electropalatography is required along with the tongue trajectories. The iTTS can include embedded touch-sensitive pressure sensors and an electrode array that can detect when the tongue touches that spot on the palate. When the user's tongue connects with the exposed electrode array in this embodiment, the impedance between electrodes can be measured and tongue contact can be determined.

The TTS system and apparatus can be expandable to multiple marker tracking. The cost function equations listed above can be expanded to multiple tracer units by adjusting the cost function to $$f(a_1, m_1, \ldots, a_M, m_M) = \sum_{j=1}^{M}\left(\sum_{i=1}^{N} \|B_{i,meas}^{meas} - B(s_i, a_j, m_j)\|\right) \quad \text{III}$$

Using multiple tracer units can improve the 3D visuals provided by some embodiments of the TTS system by fitting more points to a realistic mesh of the tongue surface.

In some embodiments, the tongue tracking apparatus can comprise: (a) a tracer unit that can be non-obstructively affixed to the tongue of the subject such that a change in position of the tongue changes position of the tracer unit; and (b) a plurality or array of sensors for detecting a position of the tracer unit and adapted for non-obstructive placement proximal to the tracer unit. The apparatus can further comprise a sensor control unit for transmitting sensor signals from the sensors to the receiver based on the detected position of the tracer unit. In some embodiments, the sensor control unit can process the sensor signals and transmit them directly to the receiver.

The signals received from the sensor control unit by the computing platform can be demodulated and demultiplexed to extract the individual sensor outputs. By processing these outputs, the motion of the tracer unit and consequently the tongue within the oral cavity can be determined.

In some embodiments of the tongue tracking apparatus, the tracer unit can comprise a magnet and the motion of the tongue is traced by an array of magnetic sensors, which measure the magnetic field generated by the magnet. The tracer unit can comprise a magnet contained within a non-magnetic fixture and affixed to the tongue. The magnetic sensors can be positioned proximal the tracer unit, and in some embodiments can be mounted on a dental retainer and attached on the outside of the teeth to measure the magnetic field from different angles and provide continuous real-time analog outputs. In other embodiments, the sensors are positioned outside the mouth, but in close proximity to the magnetic tracer unit, such as for example and not limitation, affixed on support structures attached to the head of the subject (e.g., similar to headphones) that position the one or more sensors at desired locations near the tracer unit, which can be for example and not limitation on or near left and/or right cheeks of the subject. The maximum distance for proximal placement of the magnetic sensors relative to the tracer unit can be dependent upon both the strength of the magnet and the sensitivity of the magnetic sensors. For example, a larger magnet can generate a larger magnetic field and will permit for further distance from the magnet to achieve proximal placement of the magnetic sensor. At some point, however, the magnet size may become too large to be non-obstructively affixed to the tongue as a tracer unit. Likewise, a sensor can be chosen based on increased sensitivity if a further proximal placement distance is desired. Depending on the sensitivity of the sensor and the magnetic field strength of the magnet, in some embodiments, proximal placement of the sensor with reference to the tracer unit can be less than about 20 cm, in some embodiments less than about 15 cm, in some embodiments less than about 10 cm, in some embodiments less than about 5 cm, and in some embodiments less than about 2 cm. The signals from the magnetic sensors can be linear functions of the magnetic field, which can be a continuous position-dependent property, and which can provide for continuous real-time tracking of the tongue movement.

In some embodiments, the magnet used in the tracer unit can be a flexible magnet, a rare earth magnet or a ceramic magnet. Exemplary rare earth magnets useful for incorporation within the tracer unit 1 include but are not limited to neodymium iron-boron (NdFeB) magnets and samarium-cobalt (SmCo) magnets. TABLE I lists properties of several exemplary magnets suitable for use with the presently disclosed subject matter.

TABLE I

Characteristics of Materials Used in Permanent Magnets

| Material | $B_r$ (Gauss) | $H_c$ (Oersteds) | $BH_{max}$ (MGOe) |
|---|---|---|---|
| Flexible | 1,725 | 1,325 | 0.6 |
| Ceramic 1 | 2,200 | 1,900 | 1.1 |
| Ceramic 5 | 3,950 | 2,400 | 3.6 |
| SmCo 18 | 8,600 | 7,200 | 18 |
| SmCo 26 | 10,500 | 9,200 | 26 |
| NdFeB 35 | 12,300 | 11,300 | 35 |
| NdFeB 41 | 13,050 | 12,500 | 41 |
| NdFeB 42 | 13,200 | 12,500 | 42 |
| NdFeB 43 | 13,300 | 12,500 | 43 |
| NdFeB 45 | 13,700 | 12,500 | 45 |
| NdFeB 48 | 14,200 | 12,500 | 48 |
| NdFeB 50 | 14,500 | 12,500 | 50 |
| NdFeB 52 | 14,800 | 12,500 | 52 |

In some embodiments, the computing platform can receive the sensor signal by way of a receiver or receiver unit, which can be a wireless receiver. In some embodiments, there can be a single receiver unit; in other embodiments, there can be a plurality of receiver units. In some embodiments, the plurality of sensor control units can communicate with a plurality of receivers. In some embodiments, the plurality of sensor control units can communicate with at least one receiver unit. In some embodiments, the communication between the sensor control unit and the receiver unit can be wireless. In some embodiments, the communication between the sensor control unit and the receiver unit can be wired, such as for example and not limitation, via Ethernet. In some embodiments, the communication between the sensor control unit and the receiver unit can occur via direct connection, such as for example and not limitation, USB or similar computer cable and/or connection.

In some embodiments, control of the sensor unit or plurality of sensor units can be performed by a separate controller unit, such as for example and not limitation, a high-speed field programmable gate array (FPGA) controller. In some embodiments, the sensor unit or plurality of sensor units can communicate with the FPGA controller via wired or wireless connection or direct connection, such as for example and not limitation, USB or similar computer cable and/or connection. In some embodiments, the FPGA controller can comprise a parallel sensor reader and a preprocessor, for example and not limitation, to perform preprocessing of data received from the sensor unit or plurality of sensor units. In some embodiments, the FPGA controller can also comprise a processor/controller unit, for example and not limitation, to perform further processing of the data received from the sensor unit or plurality of sensor units. In some embodiments, the FPGA controller can further comprise a wireless transmitter which can transmit processed information to a receiver unit or to the computing platform.

In some embodiments, the FPGA controller can communicate with the computing platform via wired or wireless connection or direct connection, such as for example and not limitation, USB or similar computer cable and/or connection. In some embodiments, the FPGA controller can communicate with a receiver unit via wired or wireless connection or direct connection, such as for example and not limitation, USB or similar computer cable and/or connection. The receiver unit can then communicate with the computing platform via wired or wireless connection or direct connection, such as for example and not limitation, USB or similar computer cable and/or connection.

In some embodiments, the computing platform can receive the sensor signal via Ethernet, wireless connection, wired connection, or direct connection via USB or similar computer cable and/or connection from the receiver or receiver unit. In some embodiments, the computing platform can receive the sensor signal from the receiver via a wireless connection. In some embodiments, the computing platform can comprise the graphical display and in other embodiments, the graphical display can be separate from the computing platform. In some embodiments, the graphical display can be, for example and not limitation, a computer or television screen or monitor. The graphical display can be connected to the computing platform via wired or wireless connection or direct connection, such as for example and not limitation, USB or similar computer cable and/or connection.

In some embodiments of the present invention, the computing platform can comprise one or more of a preprocessor, a position tracker and/or localizer, a data fusion unit, a postprocessor, and/or a graphical interface. In some embodiments, the computing platform can comprise one or more of a second preprocessor, a position tracker and/or localizer, a data fusion unit, a postprocessor, and/or a graphical interface.

In some embodiments of the present invention, the system and apparatus can comprise a computing platform for receiving the sensor signal from the sensor control unit, translating and processing the sensor signal to obtain tracking information from the tracer unit, generating, for example and not limitation, a graphical and/or audiovisual representation of the tracking information, and displaying the graphical and/or audiovisual representation on the graphical interface of the computing platform or a graphical display for review by the SLP, clinician, or tutor. In some embodiments, the graphical and/or audiovisual representation can comprise, for example and not limitation, a tracing, line drawing, or 3D drawing of the tongue movement and position based on the movement of the tracer unit during speech. In other embodiments, the graphical and/or audiovisual representation can comprise biofeedback, such as for example and not limitation, audiovisual, tactile, and/or vibrotactile biofeedback. In some embodiments, the biofeedback can be generated by a tongue tracking and signal processing algorithm. The tongue tracking algorithm consists of solving the inverse magnetic localization problem for a magnetic dipole, which identifies the location and orientation of a source of magnetic field vetor in the form of a magnetic dipole that has location, orientation, and amplitude. Solving the inverse magnetic localization problem is possible using a variety of numerical and population based methods, such as particle swarm optimization (PSO). The signal processing constitutes of multimodal sensor data fusion, machine learning, and pattern recognition methods.

In some embodiments, a method for tracking a subject's tongue movement and/or position and/or orientation is provided. The method can comprise positioning in the mouth of a subject a tracer unit non-obstructively carried by the tongue, such that a change in position of the tongue changes position and/or orientation of the tracer unit; detecting the position and/or orientation of the tracer unit; generating a sensor signal and tracking information based on the detected position and/or orientation of the tracer unit; and transmitting the sensor signal and tracking information to a computing platform, wherein the computer program processes the received data into a graphical representation, such as for example and not limitation, a tracing, line drawing, or 3D drawing. In some embodiments, the graphical representation can be accompanied by an audio recording. In some embodiments, the graphical representation can incorporate biofeedback, for example and not limitation, visual, audiovisual, and/or vibrotactile feedback. In some embodiments, the biofeedback can be presented to the user in the form of an interactive game. In some embodiments of the present invention, an algorithm such as for example and not limitation, a tongue tracking and signal processing algorithm, can be used by the computer to generate the graphical representation.

In some embodiments of the present invention, a method for tracking movement, position, or both of a tongue in a subject is provided. In some embodiments, the method can comprise providing in the mouth of a subject a tracer unit non-obstructively carried by the tongue such that a change in position of the tongue changes position and/or orientation (or both) of the tracer unit; detecting at least one of the movement, position and orientation of the tracer unit (or all three); generating a signal based on the detected position, orientation, and movement (e.g., during production of a certain sound, word, or phrase) of the tracer unit; and analyzing the signal to thereby track movement, position, orientation or all three of the tongue in real-time. In some embodiments, the movement and/or position and/or orientation of the tongue can be tracked in 3D. In some embodiments, the method can be used to provide a SSI for a user who has, for example, no voice or a weak voice or disordered voice or unintelligible voice. In some embodiments, the SSI can be wireless and can be easily portable and/or wearable by the user.

In some embodiments of the present invention, a method for tracking a user's tongue characteristic during speech is provided. The tongue characteristic can include, for example and not limitation, one or more of a position of the tracer unit, an orientation of the tracer unit, a sound produced by the user, an air flow produced by the user, a lip movement/gesture produced by the user, a physical contact between the tongue and a palate of the user, a muscle movement produced by the user, and/or an electrical activity of a brain of the user. In some embodiments, the method can track one or more tongue characteristics and can display a graphical representation of the tongue characteristic(s) such as for example and not limitation, a tracing, line drawing, or 3D drawing. In some embodiments, the graphical representation can be accompanied by an audio recording. In some embodiments, the graphical representation can incorporate biofeedback, for example and not limitation, visual, audiovisual, and/or vibrotactile feedback. In some embodiments, the biofeedback can be presented to the user in the form of an interactive game. In some embodiments of the present invention, an algorithm such as for example and not limitation, a tongue tracking and signal processing algorithm, can be used by the computer to generate the graphical representation.

In some embodiments, the method can further comprise transmitting the signal to a computing platform, wherein the computing platform can process and analyze the signal. In some embodiments, the method can comprise repeating each of the certain sounds, words, and/or phrases a desired number of times to track tongue movement and/or position over a time period to generate a tongue movement pattern for that sound, word, and/or phrase. Further, in some embodiments, the method can comprise comparing the tongue movement pattern to a standard, normal, and target tongue movement pattern, which can be provided by a SLP, clinician, or tutor, as part of a speech analysis program, a speech therapy program, or both. In some embodiments, methods are provided for tracking movement, position, orientation or all three of a tongue in a subject. In some embodiments, the method comprises providing in the mouth of a subject a tracer unit such that a change in position (and/or orientation) of the tongue changes position (and/or orientation) of the tracer; optionally changing a position (and/or orientation) of the tracer unit by moving the tongue; detecting the position (and/or orientation) of the tracer unit; generating a signal based on the detected position (and/or orientation) of the tracer unit; and analyzing the signal to thereby track movement, position, orientation or all three of the tongue. In some embodiments, the signal can be transmitted to a computer for analysis and determination of tongue movement and/or position and/or orientation, which can aid in speech analysis and/or therapy. In some embodiments, tongue movement, position, orientation or all three are tracked a desired number of times over a time period to generate a tongue movement pattern. The tongue movement pattern can then be compared to a standard tongue movement pattern as part of a speech analysis program, a speech therapy program, or both. In some embodiments, the analysis and determination of tongue movement and/or position can be performed by the computer using an algorithm, such as for example and not limitation, a tongue tracking and signal processing algorithm.

The apparatus utilized for the methods can in some embodiments comprise the tracer unit non-obstructively affixed to the tongue (e.g., temporarily with a clip or a biocompatible tissue adhesive), at least two sensors for detecting the position and orientation (or both) of the tracer unit and adapted for non-obstructive placement proximal the tracer unit, and a sensor control unit for transmitting the sensor signal to a computer for analysis based on the detected position and orientation (or both) of the tracer unit. In some embodiments, the at least one sensor comprises an array of sensors and the apparatus further comprises power management circuitry for controlling power distribution to the plurality of sensors, as disclosed herein.

FIG. 1 is a block diagram for an embodiment of a wireless TTS system 10. The wireless TTS system 10 can include a magnetic tracer unit 1 that can be attached to the user's tongue. The tracer unit 1 can be coated with a non-magnetic biocompatible material, such as gold, platinum, or a polymer, and non-obstructively affixed to the tongue. "Affixed to the tongue" as used herein refers to secured to the tongue such that tracer unit 1 is not easily dislodged from the tongue and tracks tongue movement accurately. That is, the tracer unit 1 is secured tightly enough to the tongue such that fine movements of tongue are not lost to the magnetic sensors 12 due to wobble or other unnecessary motion of the tracer unit 1. In some embodiments of the present invention, the tracer unit 1 can be mounted on a post that is pierced through the tongue, or tracer unit 1 can be embedded within the tongue. In other embodiments, instead of pierced or implanted tracer units 1, a subject can have tracer unit 1 non-permanently attached to his tongue, such as for example and not limitation, by small plastic clips, elastic bands, and/or magnetic tongue clips. It is also possible to temporarily attach the tracer unit 1 to the subject's tongue using a waterproof biocompatible tissue adhesive such as Dermabond® (Johnson & Johnson, New Brunswick, N.J.) or Cyanodent® (Ellman International Inc., Oceanside, N.Y.) or Vetbond® (3M, Maplewood, Minn.). In essence, the tongue can carry the tracer unit 1 as it moves within the oral cavity during speech. Due to the non-obstructive nature of the tracer unit 1, the subject's speech should be unaffected.

The wireless TTS system 10 can include a scalable number of wireless sensor control units 2 with magnetic field sensors 12, a processor 13, and a wireless transmitter 11. In some embodiments, the wireless transmitters 11 can be on a wearable headset and can communicate with multiple receiving units 3 that relay the magnetic sensor data to a central computing platform 5. The computing platform 5 can process the magnetic data along with other peripheral sensors, such as for example and not limitation, a microphone 7, camera 6, and additional sensors 8, which can comprise, for example and not limitation, an air pressure sensor, and/or flow sensor. The computing platform 5 can comprise one or more of a preprocessor 14, a position tracker and/or localizer 15, a data fusion and/or postprocessor 16, and/or a graphical interface 17. The data can be displayed on a graphical display 9 and can be further processed for measurement and classification applications. The receiving units 3 can communicate with the computing platform 5 via, for example and not limitation, a USB connection 4. The graphical display 9 can be, for example and not limitation, a computer, smartphone, tablet, or television screen or monitor.

Figure 2:
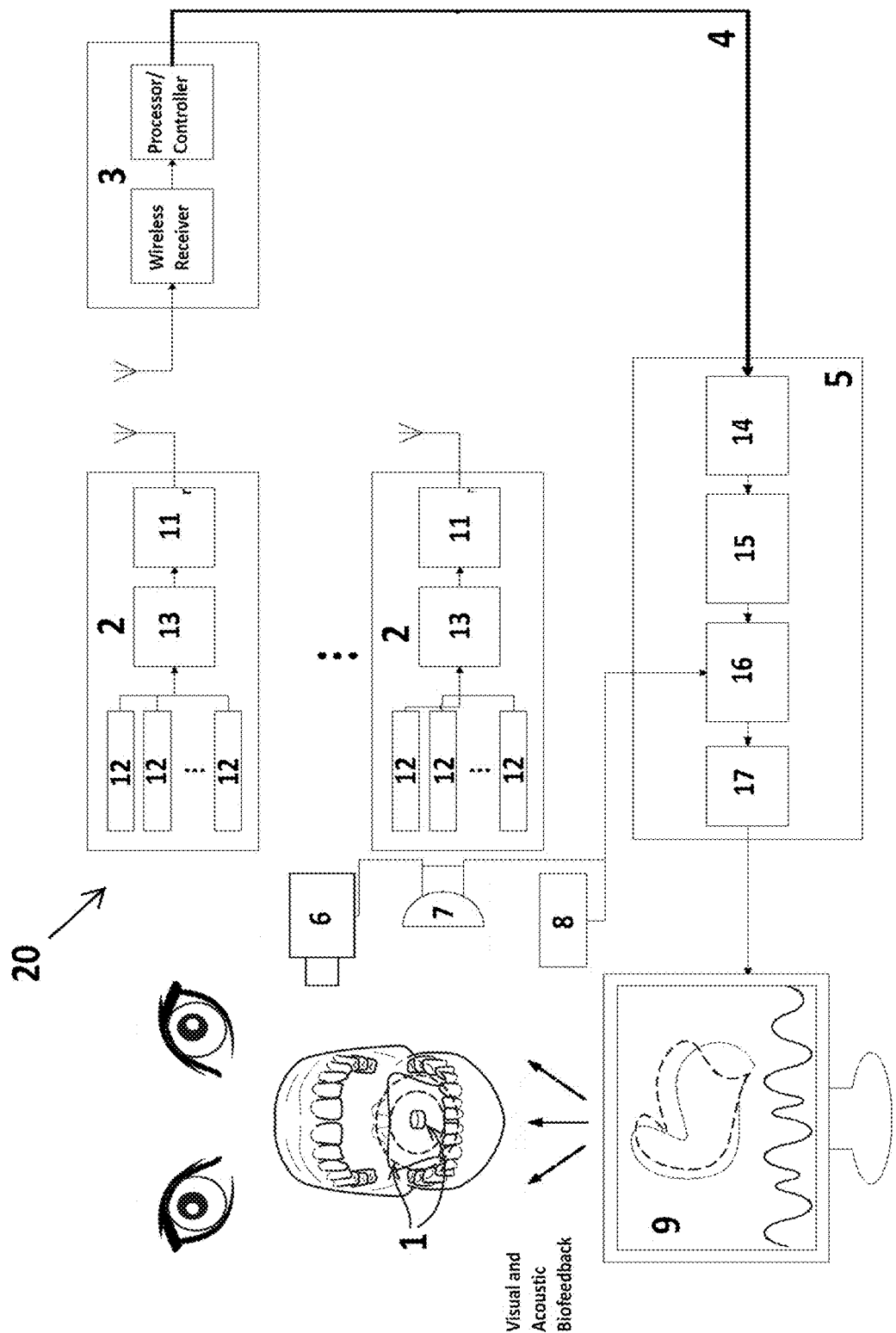
FIG. 2 is a block diagram for an embodiment of a wireless TTS system and apparatus with a scalable number of wireless sensor units.

FIG. 2 is a block diagram for an embodiment of a wireless TTS system 20 with a scalable number of wireless sensor control units 2. The data packets can be given unique addresses and sent to a single receiver unit 3. In some embodiments, the wireless transmitters 11 can be on a wearable headset and can communicate with at least one receiver unit 3 that can relay the magnetic and other sensor data to a central computing platform 5. In some embodiments, the at least one receiver unit 3 can pass the data to the computing platform 5 for processing the data and fusion with additional sensors, such as for example and not limitation, a microphone 7, camera 6, and additional sensors 8, which can comprise, for example and not limitation, an air pressure sensor, and/or flow sensor. The data can be displayed on a graphical display 9 and can be further processed for measurement and classification applications. The receiving units 3 can communicate with the computing platform 5 via, for example and not limitation, a USB connection 4.

Figure 3:
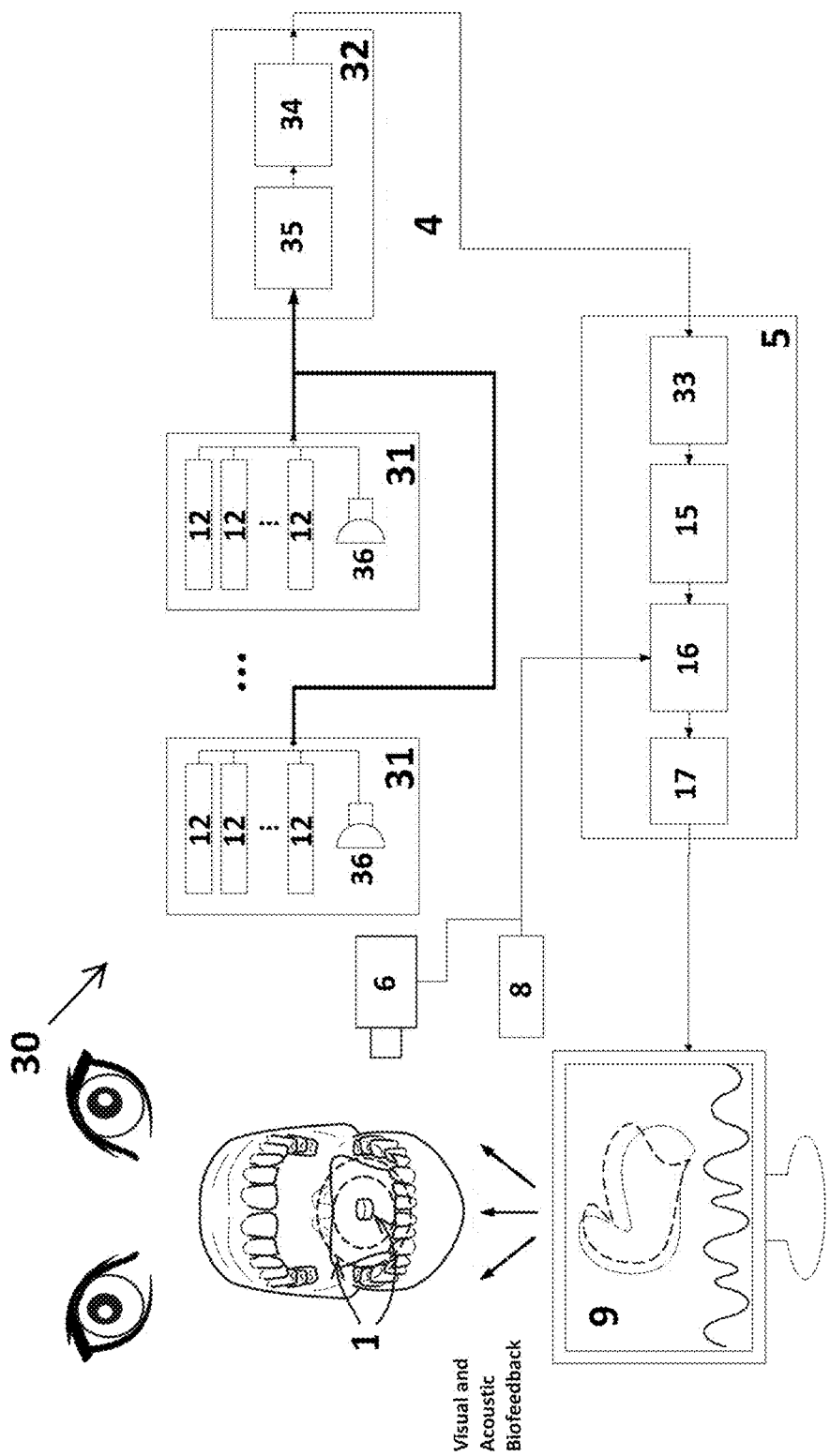
FIG. 3 is a block diagram of an embodiment comprising a wired high-speed TTS system and apparatus. Some embodiments can comprise a scalable number of wired sensor units.

FIG. 3 is a block diagram of an embodiment comprising a wired high-speed TTS system 30. In some embodiments, the sensor units 31 can comprise a microphone 36. A scalable number of wired sensor units 31 can communicate in parallel with a processor that can be, for example and not limitation, a high-speed field programmable gate array (FPGA) controller 32. The FPGA controller 32 can comprise one or more of a preprocessor 34, memory, and/or a parallel sensor interface 35. The FPGA controller 32 can implement fast pre-processing of the sensor data before sending it to a central computing platform 5 for, for example and not limitation, additional processing, localization, recording, and/or display. The computing platform 5 can implement post-processing functions for different applications, such as for example and not limitation, fusion of data from a camera 6 and/or additional sensors 8, which can comprise, for example and not limitation, an air pressure sensor, and/or flow sensor. The information processed by the computing platform 5 can be displayed on a graphical display 9, such as for example and not limitation, a computer, television, smartphone, or tablet screen or monitor for review by the user and/or therapist. The FPGA controller 32 can communicate with the computing platform 5 via, for example and not limitation, a USB connection 4. In some embodiments, the computing platform 5 can further comprise a second preprocessor 33.

Figure 4:
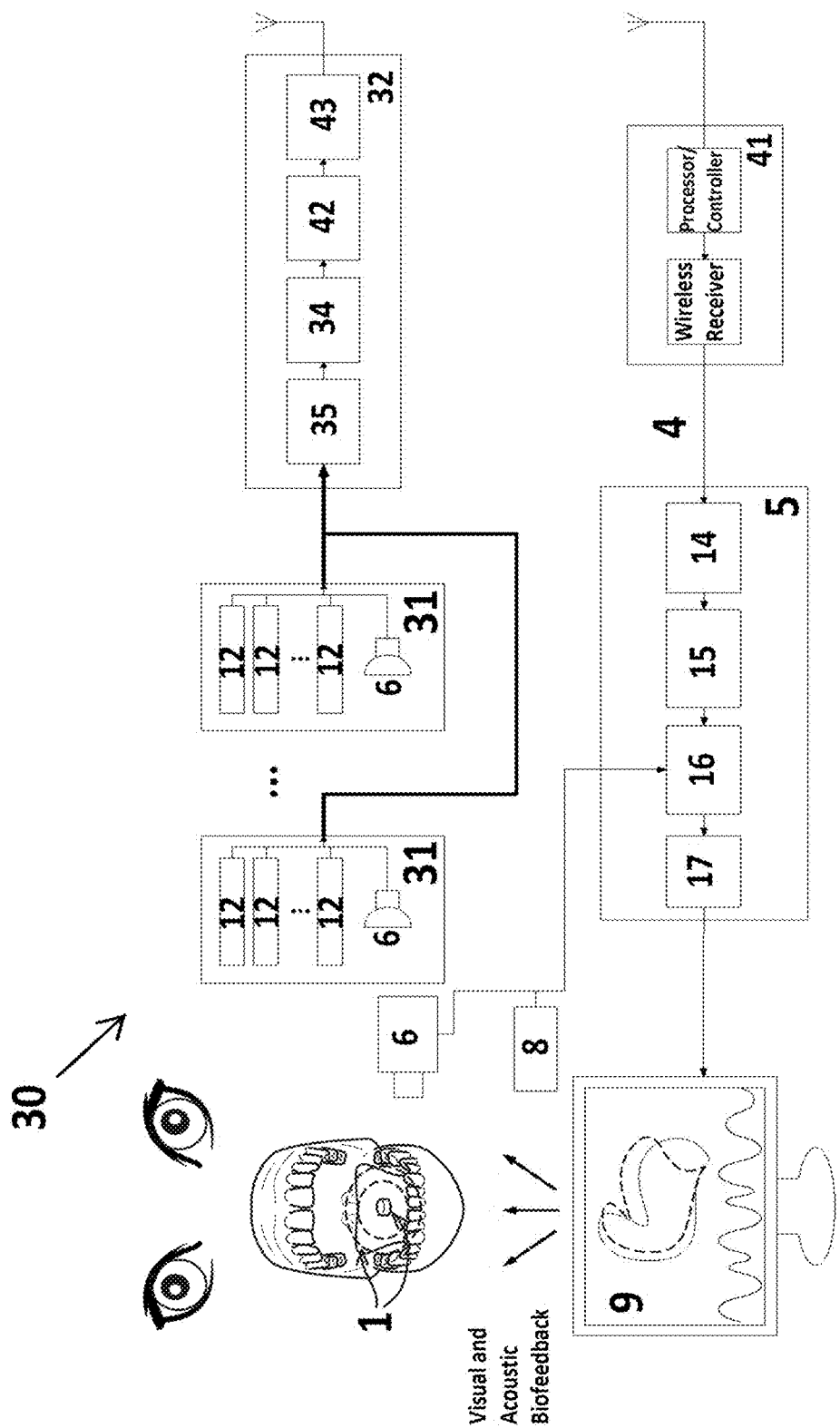
FIG. 4 is a block diagram of an embodiment of the present invention comprising a high-speed wireless TTS system and apparatus. Some embodiments can comprise a scalable number of wireless sensor units.

FIG. 4 is a block diagram of an embodiment of the present invention comprising a high-speed wireless TTS system 40. A scalable number of sensor units 31 can communicate with, for example and not limitation, an FPGA controller 32 in parallel. The FPGA controller 32 can comprise one or more of a preprocessor 34, a parallel sensor reader 35, a processor/controller 42, and/or a wireless transmitter 43. The data can be wirelessly transmitted via the wireless transmitter 43 to a base receiver unit 41. The receiver unit 41 can pass the data to a computing platform 5 via, for example and not limitation, a USB connection 4, followed by localization of the magnetic tracer 1. After localization, data from the camera 6 and/or additional sensors 8 can be fused with the preprocessed data, and application specific processing can then performed by the computing platform 5. Information processed by the computing platform 5 can generate, for example and not limitation, an audiovisual feedback, which can be presented to the end user and/or therapist via graphical display 9, such as for example and not limitation, a computer or television screen or monitor.

Figure 5:
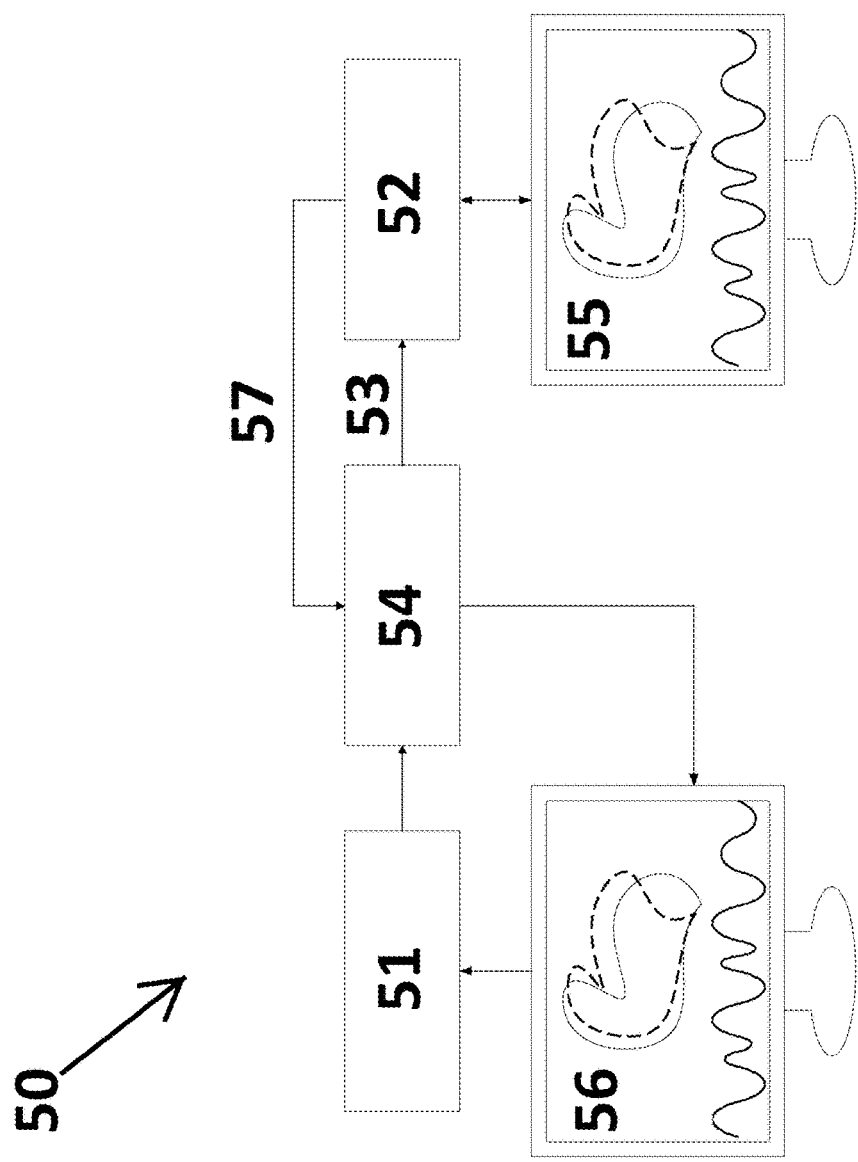
FIG. 5 is a block diagram of an embodiment of the present invention which comprises remote therapy setup of the TTS system and apparatus.

FIG. 5 is a block diagram of an embodiment of the present invention which comprises a remote therapy setup of the TTS system 50. The patient 51 (or second language learner in some embodiments), and the therapist 52, who can be for example and not limitation a clinician, SLP, or tutor, can connect through a network 53, which can be the internet. All measured data can be sent digitally to the clinician after processing by the system 54 in real-time for display on the therapist's graphical display 55. In some embodiments, the audiovisual biofeedback of the patient's speech can be updated simultaneously on the therapist's graphical display 55 and on the patient's graphical display 56. During the therapy session, the therapist 52 can adjust the patient's TTS system 54 and the audiovisual biofeedback provided by the TTS system 54 and displayed on the user's graphical display 56 to provide remote feedback 57 to improve the patient's performance and the outcomes of the specific treatment, just as if they were meeting in person. In some sub-embodiments of the present invention that are not depicted here, the therapist 52 can use a second TTS apparatus and system to show his/her tongue motion to the patient 51 as a reference trajectory that should be imitated.

Figure 6:
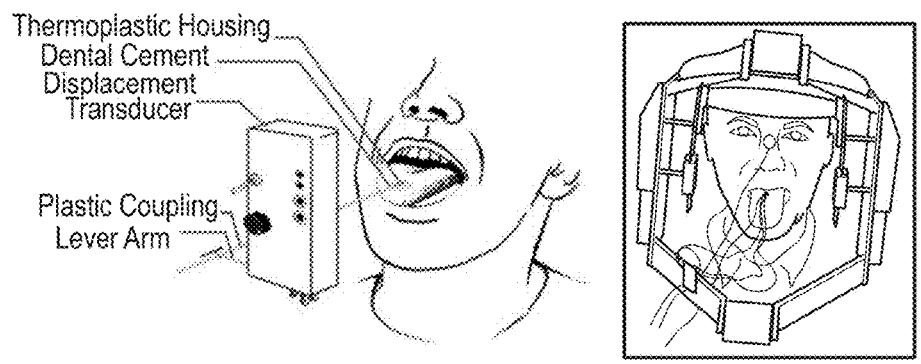
FIG. 6 provides an example of prior art tongue tracking systems.

FIG. 6 provides an example of prior art tongue tracking systems. The left panel shows an existing 1D tongue motion tracker using a lever arm. The right panel shows a 3D localization system using hardwired coils and electromagnetic articulography (EMA) from Carstens (Germany). Multiple coils are attached to the tongue with wires feeding out of the mouth, possibly interfering with the tongue motion.

Figure 7:
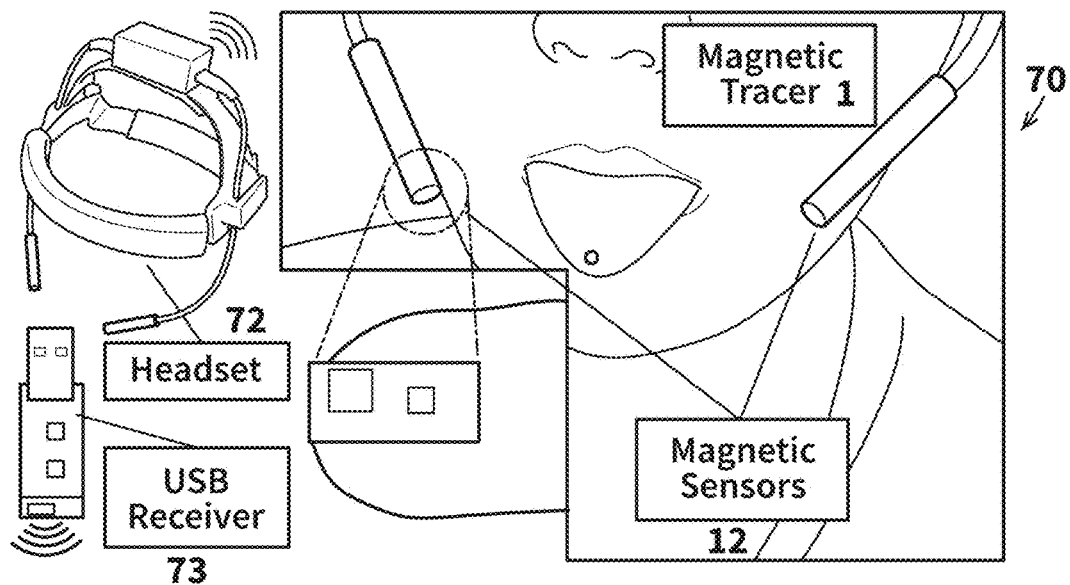
FIG. 7 shows an embodiment of the TTS core that is based on the Tongue Drive System (TDS).

FIG. 7 shows an embodiment of the TTS core 70 that is based on the Tongue Drive System (TDS), shown in this figure.[9] Elements of the TTS core 70 in some embodiments can comprise one or more of a magnetic tracer unit 1, at least one magnetic field sensor 12, at least one USB receiver 73, and/or a headset 72. Some embodiments can have a plurality of magnetic field sensors 12 or an array of magnetic field sensors 12. Some embodiments can have a plurality of receiver units 3, which can be for example and not limitation, USB receivers 73. This embodiment can use four 3-axis magnetometers mounted on a wireless headset 72 for tracking a magnetic tracer unit 1. The system containing this TTS core 70 can be trained to find the magnet in six discrete locations inside the mouth. In some embodiments, the TDS interfaces to the external devices (such as for example and not limitation, the computing platform 5 and graphical display 9—not pictured) through custom hardware and software, including computers, smartphones, wheelchairs, robotic arms, and other connected appliances in the user environment.

Figure 8:
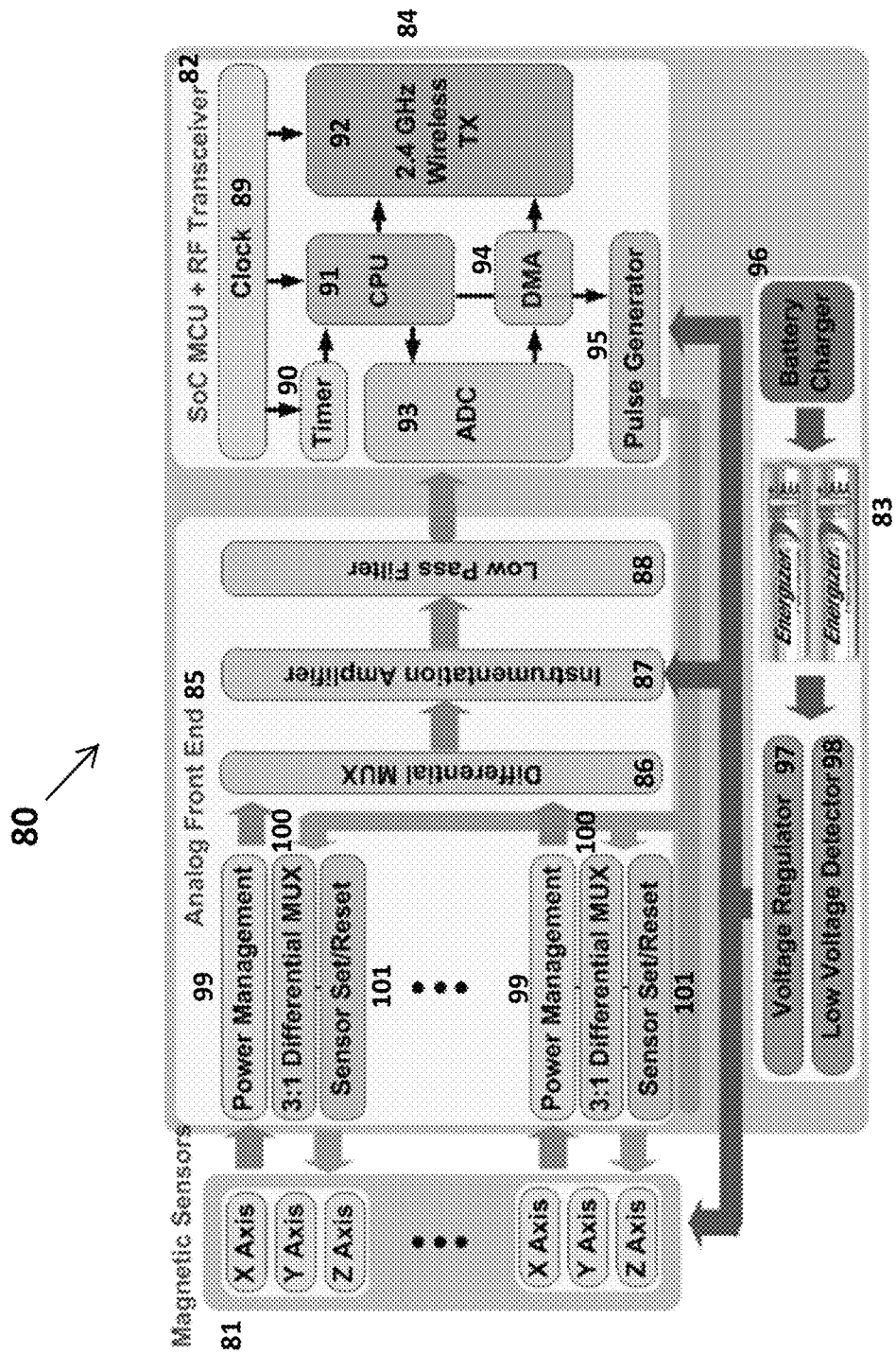
FIG. 8 is a block diagram of an embodiment of the sensor control unit according to some embodiments of the present invention.

FIG. 8 is a block diagram of an embodiment of the wireless sensor control unit 80 according to some embodiments of the present invention. Each magnetic sensor 81 in this embodiment has three main axes (X, Y, and Z). Each of these axes can be a Weatstone bridge, the output of which can be selected by a 3 to 1 (3:1) differential multiplexer (MUX) 100 before being fed into an instrumentation amplifier 87 to increase the analog sensor signal amplitude. The amplified signal can then pass through a low-pass filter 88 to reduce the external high frequency interference. The resulting filtered signal can then be digitized by an analog to digital converter (ADC) 93, which can be part of a muicrocontroller unit (MCU). In some embodiments, a pulse generator 95 can reset the magnetic sensors after a few samples to reduce the offset. A power management circuit can be used to cycle through the sensors and turn them off when they are not being sampled to save power.

This sensor control unit 80 can comprise a plurality or an array of magnetic sensors 81, which can be capable of sensing magnetic fields in one or more of the X-, Y-, and/or Z-axes, interfaced to, for example and not limitation, a system on a chip (SoC) and RF transceiver 82. The power can be supplied via, for example and not limitation, an internal regulated battery 83 or, in some embodiments, externally via, for example and not limitation, USB (not pictured). In some embodiments, when external power is supplied, the internal battery 83 can be charged. Data from the magnetic sensors 81 can be broadcasted at 2.4 GHz via a wireless transmitter 92 to, for example and not limitation, a USB or Bluetooth receiver. The sensor control unit 80 can also comprise an analog front end controller 85, and a back-end receiver 82, which can be, for example and not limitation, a SoC and RF transceiver, which are further described in FIG. 9.

The analog front end controller 85 can comprise one or more of a plurality of magnetic sensors 81, a plurality of power management functions 99, a plurality of 3:1 differential MUXs 100, a plurality of Sensor set/reset functions 101. The power management functions 99 can communicate with a differential MUX 86, which can communicate with an instrumentation amplifier 87, which can further communicate with a low pass filter 88, which can communicate with the ADC 93 of the back-end receiver 82. The analog front end controller 85 can also comprise a battery charger 96, battery 83, voltage regulator 97, and low voltage detector 98. The battery 83 can provide power to, for example and not limitation, the instrumentation amplifier 87, the magnetic sensors 81, and/or the pulse generator 95 of the back-end receiver 82.

The back-end receiver 82 can comprise one or more of a clock 89, a timer 90, a central processing unit (CPU) 91, a wireless transmitter 92, an ADC 93, a direct memory access (DMA) 94, and/or a pulse generator 95. The pulse generator 95 can communicate with, for example, the 3:1 differential MUXs 100 of the analog front end controller 85. The clock 89 can communicate with one or more of the timer 90, the CPU 91, and/or the wireless transmitter 92. The timer 90 can communicate with the CPU 91. The CPU 91 can communicate with one or more of the wireless transmitter 92, the ADC 93, and/or the pulse generator 95. The ADC 93 can communicate with, for example, the DMA 94. The DMA 94 can communicate with, for example, the wireless transmitter 92.

Figure 9:
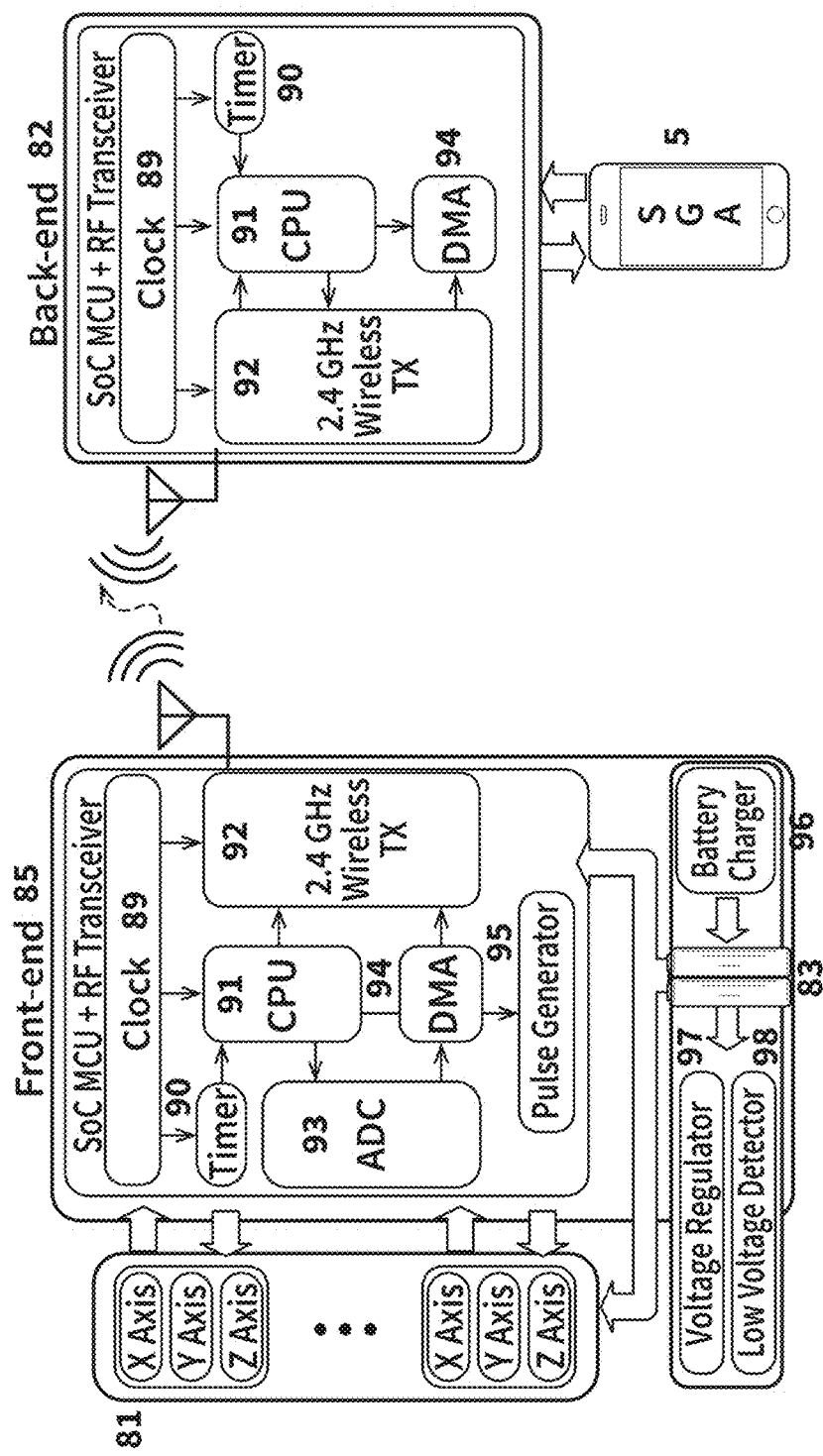
FIG. 9 is a block diagram of an embodiment of the front-end wireless sensor control unit and back-end receiver according to some embodiments of the present invention.

FIG. 9 is a block diagram of an embodiment of the wireless sensor control unit 80 and the analog front-end controller 85 and the back-end receiver 82 according to some embodiments of the present invention. The back-end receiver 82 can demodulate the data and then can communicate it to a computing platform 5. In some embodiments, the computing platform 5 can be a mobile device, such as for example and not limitation, a tablet, smartphone, laptop, or other computing device. The computing platform 5 can process the data, fuse other measurements, and implement the pre-processing application code. In some embodiments, the processing, fusing, and implementation can be performed by the computing platform 5 using an algorithm, such as for example and not limitation, a tongue tracking and signal processing algorithm. This implementation can include, for example and not limitation, projecting the processed data on a graphical display 9, classifying trajectories, and/or indexing a database of speech or commands. In some embodiments, the analog front-end controller 85 and the back-end receiver 82 can communicate wirelessly.

Figure 10:
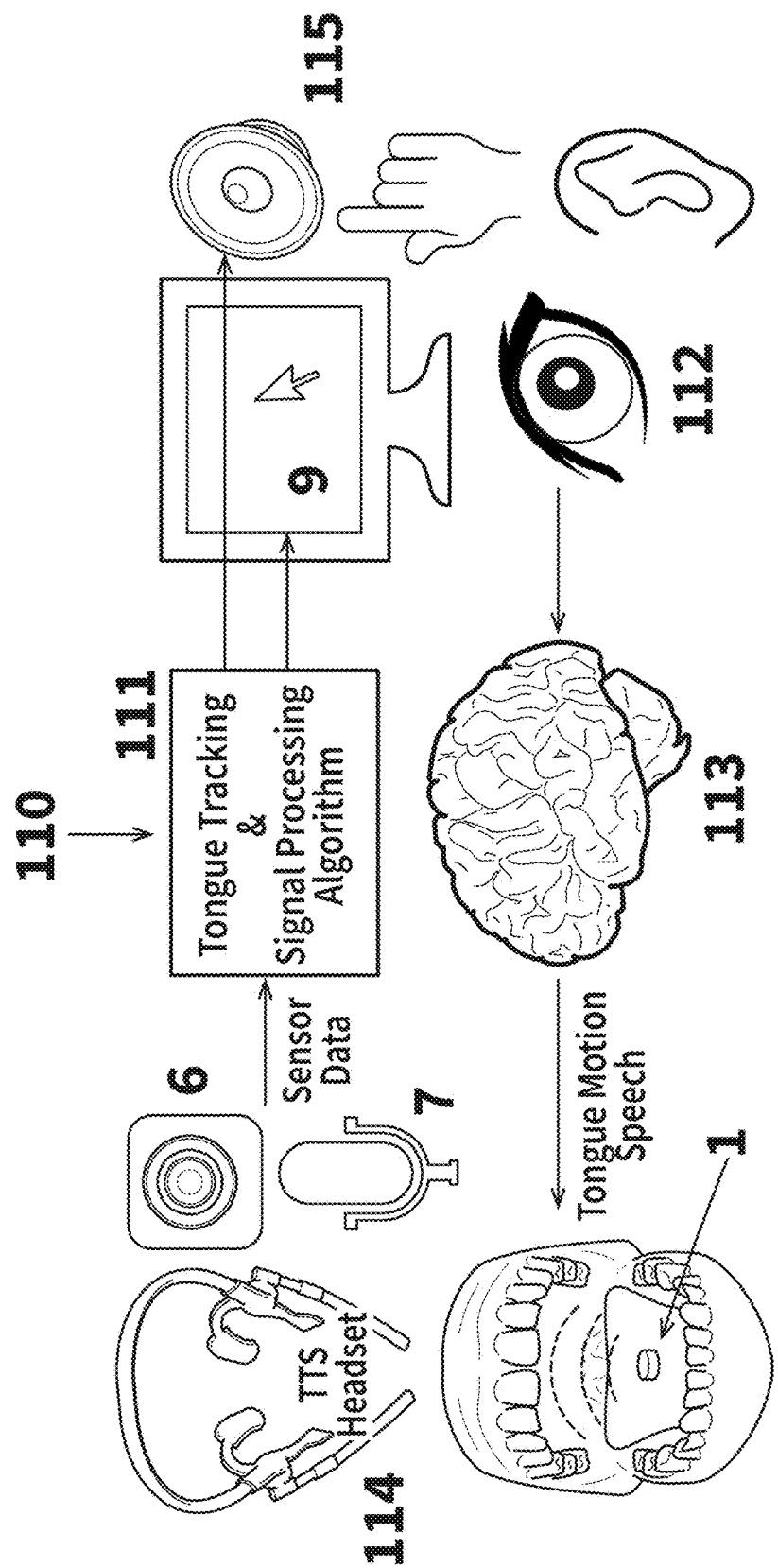
FIG. 10 is a flow diagram of an embodiment of the audiovisual biofeedback therapy mechanism according to some embodiments of the present invention.

FIG. 10 is a flow diagram of an embodiment of the audiovisual biofeedback therapy mechanism 110 of the present system. A user can have a magnetic tracer 1 attached to his tongue. When he moves the magnetic tracer 1, such as during speech, the TTS system and apparatus can measure the changes in the magnetic field and pass it to the tongue tracking and signal processing algorithm 111. The algorithm 111 can localize the magnetic tracer 1 within the 3D oral space and can fuse it with additional sensor data, which can be, for example and not limitation, from a camera 6 and/or microphone 7. Some or all of the sensors may be incorporated into a headset 114, which can be wireless. In some embodiments that are not pictured here, the additional sensor data can include, for example and not limitation, acoustic, visual/imaging (lip reading), air flow and pressure in front of the user's mouth, and/or data from electrode arrays performing EMG of various articulator muscles, electropalatography, and/or EEG. The algorithm 111 of the TTS system and apparatus can then further process and present the data to the user, such as for example and not limitation, via audio, visual, and/or tactile biofeedback 112. The user can see, hear, and/or feel the multimodal biofeedback 112 and his brain 113 can process that information. The user can then use the multimodal biofeedback 112 to adjust and/or correct his tongue motion and speech during therapy or exercise sessions at the SLP's or clinician's office or in another location, such as for example and not limitation his home and/or work environment. The cycle of biofeedback repeats and changes for the better according to both the user's and the clinician's input, creating an efficient and effective treatment paradigm.

In one embodiment of the TTS system, the system can integrate multiple modes of data from both patient (user) and SLP (clinician) and merge them into one or more modes of display for biofeedback. In this embodiment, the TTS system can fuse raw acoustic data from a plurality of input devices and/or sensors (pictured in FIG. 1), such as for example and not limitation, a microphone, camera, or other acoustic sensor, and raw magnetic data corresponding to the user's tongue-position using, for example and not limitation, a microphone, camera, and/or array or plurality of magnetometers and/or sensors. In this embodiment, when the user speaks, the microphone can record the speech, the camera can record lip reading, and the magnetic sensors can record the tongue position and movement. These raw acoustic data and raw magnetic data can be filtered and synchronized based on a common time base at a higher frequency than the highest sampling rate, by interleaving or extrapolating in between the digital samples taken at the same time or after time-warping and feature extraction. From this point, the processed acoustic data can be converted to Mel Cepstral Coefficients for use in a multimodal speech recognition module and the processed magnetic data can be converted to 3D tongue trajectories for use in an audiovisual biofeedback module. Both the multimodal speech recognition module and the audiovisual biofeedback module can be incorporated into an interactive game with corrective audiovisual biofeedback to motivate the user to continue practicing, while quantifying and showing his/her progress by generating a score.

Multimodal data can then be passed on to the processor or computing platform for data pre-processing and fusion. The data can be fused together into a single or multimodal graphical representation that can be displayed on graphical display to inform the user how he is speaking and how to adjust his speech to be closer to normal. The graphical representation can be, for example and not limitation, a direct biofeedback mechanism or speech waveforms and 2D or 3D tongue trajectories during speech. In some embodiments, the data can be transformed into other biofeedback modalities integrated into an interactive game with corrective audiovisual biofeedback. Such methods can provide corrective biofeedback for the user's brain to process, and can adapt and react to the user's progress in accomplishing the requested tasks.

Figure 11:
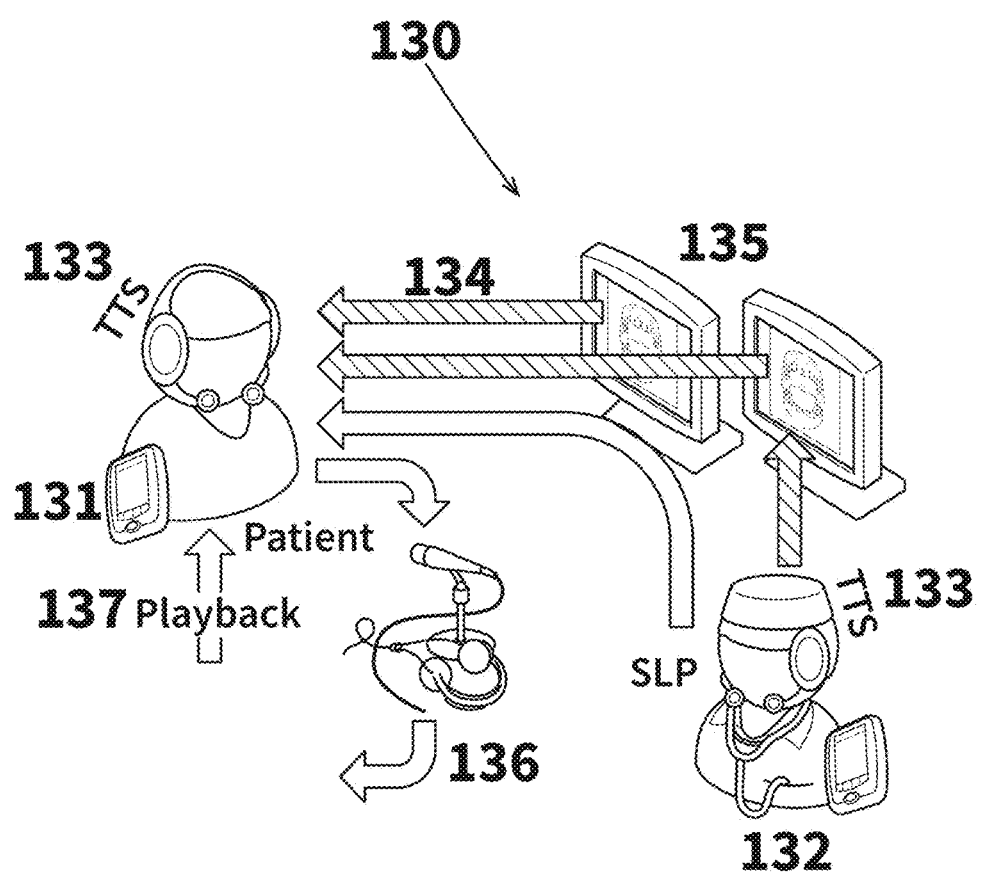
FIG. 11 is an exemplary embodiment of the present invention in which both the patient and clinician are each wearing a TTS apparatus.

FIG. 11 is an exemplary embodiment 130 according to some embodiments of the present invention in which both the patient 131 and SLP 132 are each wearing a TTS apparatus 133. The SLP 132 can create the "template" or standard or target trajectory with her tongue motion as she speaks and the patient 131 can follow and work to match the trajectory. In this embodiment, the TTS system can process both inputs and can scale them both in amplitude and in time (e.g. synchronization and time warping) for the best matching. The TTS system can also calculate the difference between the two trajectories and can then represent the difference as a visual and/or audiovisual and/or vibrotactile biofeedback 134 to the patient 131 (and/or the SLP 132) in the form of, for example and not limitation, a score to be maximized or an error bar to be minimized. The displays 135 for the patient 131 and SLP 132 can be updated in real-time and can adapt as the therapy session progresses. In this embodiment, the session can be implemented remotely, and the SLP 132 and patient 131 do not need to be physically in the same location. In some embodiments, the TTS system can make an audio recording 136 of the session so that the patient 131 can playback 137 the session at a later date. In some sub-embodiments of this embodiment (not pictured), there is the possibility for one SLP 132 to interact with multiple patients 131 simultaneously, such that every patient 131 could receive his/her own individualized biofeedback and error measures, while the SLP 132 receives inputs on the progress that each patient 131 is making, or lack thereof. In some embodiments of the invention, the audio recording 136 and/or playback 137 can be incorporated into the visual feedback 134 displayed on the displays 135 to create, for example and not limitation, audiovisual feedback or biofeedback.

Figure 12:
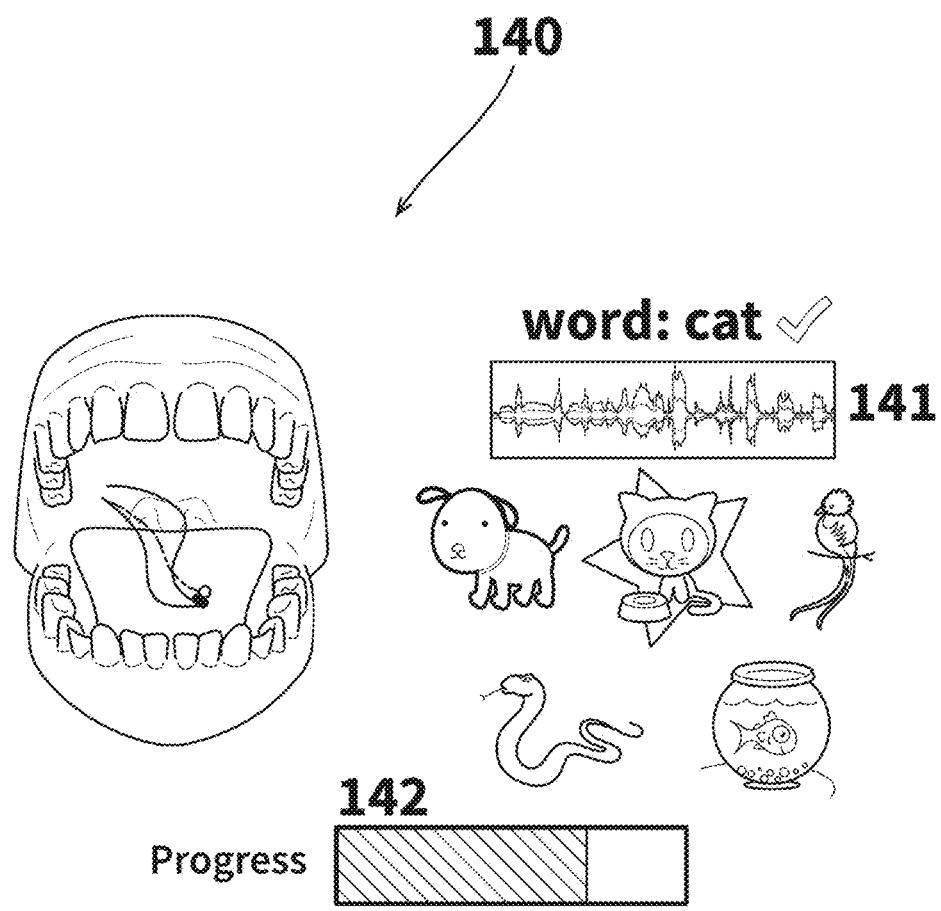
FIG. 12 provides an exemplary embodiment of an interactive game according to some embodiments of the present invention in which the user needs to trace out certain trajectories while speaking

FIG. 12 provides an exemplary embodiment 140 of an interactive game in which the user needs to trace out certain trajectories while speaking; in this sample game, the user is attempting to speak the word "cat". The magnetic tracer unit 1 takes a path indicated by the lines in the oral cavity, which can be represented as shown in the tracing 141. Depending on the success or failure of the patient in accomplishing this task, the game can progress 142 and allow the patient to move onto the next stage by uttering a new word, while the clinician can change the targets and/or tasks to hit specific areas that may need improvement for speech and language therapy purposes.

Figure 13:
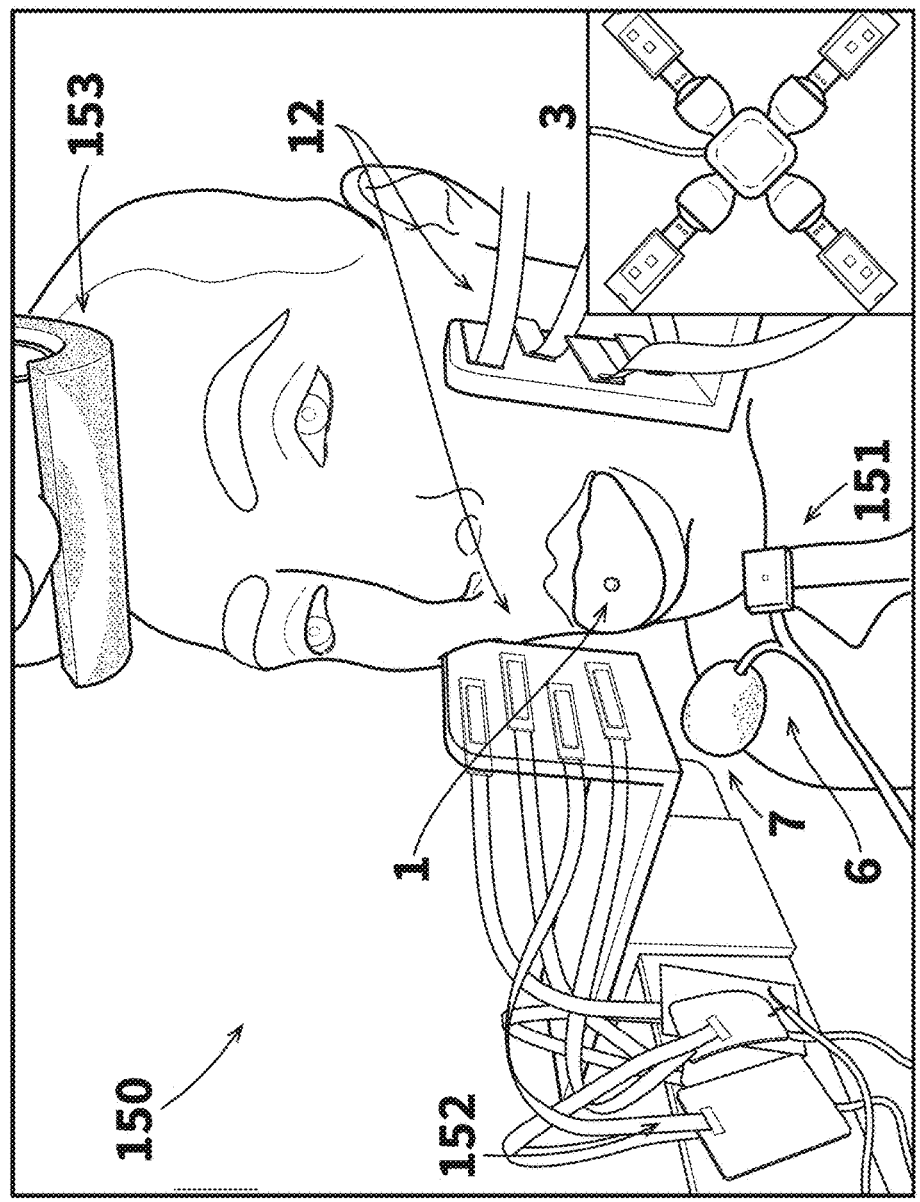
FIG. 13 is a conceptual TTS prototype system and apparatus, according to some embodiments of the present invention.

FIG. 13 is a conceptual TTS prototype system and apparatus 150, according to some embodiments of the present invention. In such embodiments, the TTS system and apparatus can comprise one or more magnetic sensors 12, or an array or plurality of magnetic sensors 12, and additional sensors for different applications which can comprise, for example and not limitation, a microphone 7, a camera 6, an air pressure sensor, flow sensor, and/or electrode arrays for EMG from various articulator muscles, electropalatography, and/or EEG. The magnetic sensors 12 can track the position, movement, and orientation (or two or all three) of the tracer unit 1 in the user's mouth. In an exemplary embodiment, the TTS system and apparatus can include an embedded microphone 7, camera 6, and air pressure sensor 151 in front of the subject's mouth. The camera 6 can track, for example, lip movements and/or gestures and the TTS system can fuse the visual data with input from the other sensors, such as for example and not limitation, the magnetic sensor data and acoustic input from the microphone and air pressure sensor. The input from the magnetic sensors 12 and additional sensors can be received by a receiving unit 3 and can be transmitted by a transmitter 152 to a computing platform 5 (not pictured). The user can rest his head on the head support 153 to minimize movement during speech and to maintain consistent orientation relative to the magnetic sensors 12 and additional sensors 8.

Figure 14:
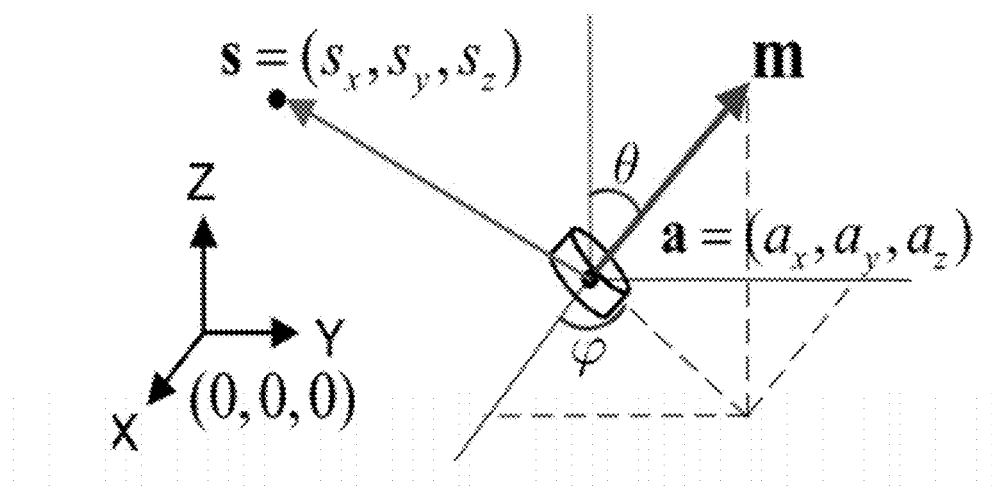
FIG. 14 is a graphical representation of an ideal magnet dipole that can be utilized in some embodiments of the present invention.

FIG. 14 is a graphical representation of an ideal magnetic dipole in a global reference frame that has a position vector and an orientation vector. Different magnetic fields that are unique can be created for different displacement vectors, which can be sensed at a finite number of sensor locations around the magnetic dipole. Using the magnetic dipole equations, it is possible to solve the inverse problem either numerically or by using other techniques such as neural network, population based, and machine learning to localize the position and orientation of the magnetic tracer based on the recorded magnetic sensor data. Generally, the more sensors present in the space around the magnetic dipole, the better the localization accuracy.

Figure 15:
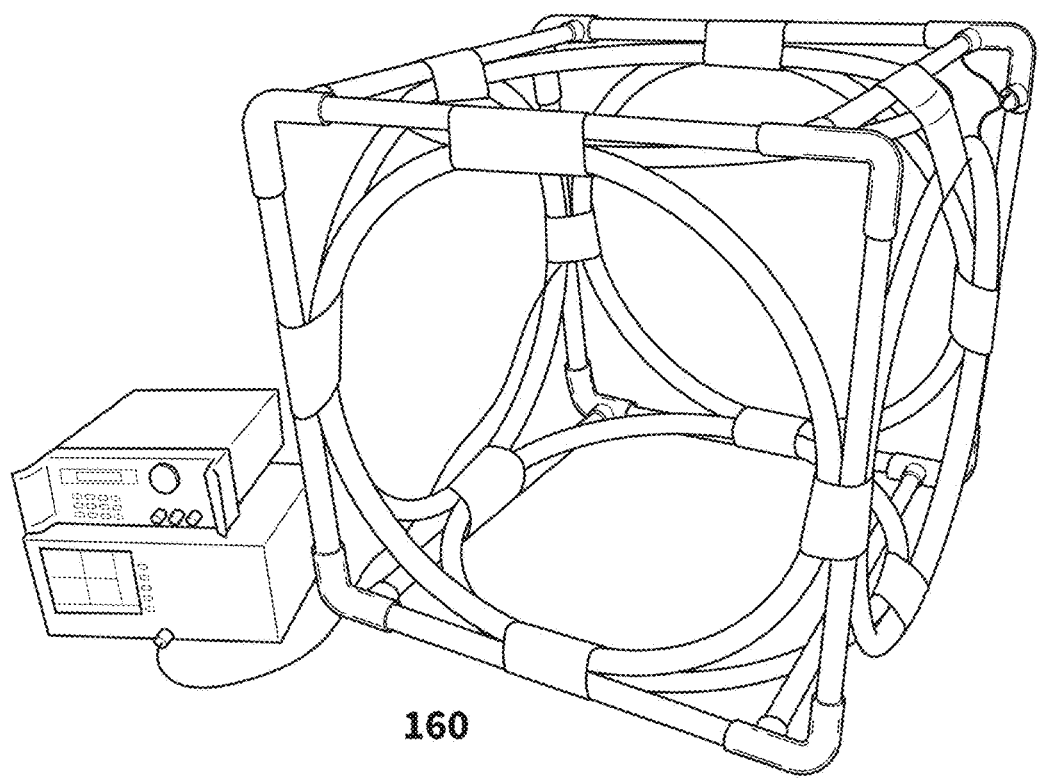
FIG. 15 is a representation of a component involved in an exemplary method of calibrating the TTS system and apparatus according to some embodiments of the present invention.

FIG. 15 is a representation of a component 160 involved in an exemplary method of calibrating the TTS system and apparatus. In some embodiments of the present invention, the 3D magnetometers require precise calibration for measuring accurate magnetic field generated by the magnetic tracer. An exemplary method used to generate a known and fairly homogeneous external magnetic field can be by using a 3-axis Helmholtz cage 160 consisting of 6 coils each on one side of a cube. The magnetic sensor under calibration is placed inside the center of the Hemholtz cage 160, a computer controlled current source passes a known current through each pair of coils facing each other to generate a known magnetic field vector inside the cage, and measurements are recorded at different external field values and orientations. The calibration coefficients are then determined from the recorded magnetic sensor data. In normal TTS operation, the calibration coefficients are applied to the magnetometer measurements during the pre-processing stage, before magnetic localization is performed.

Figure 16:
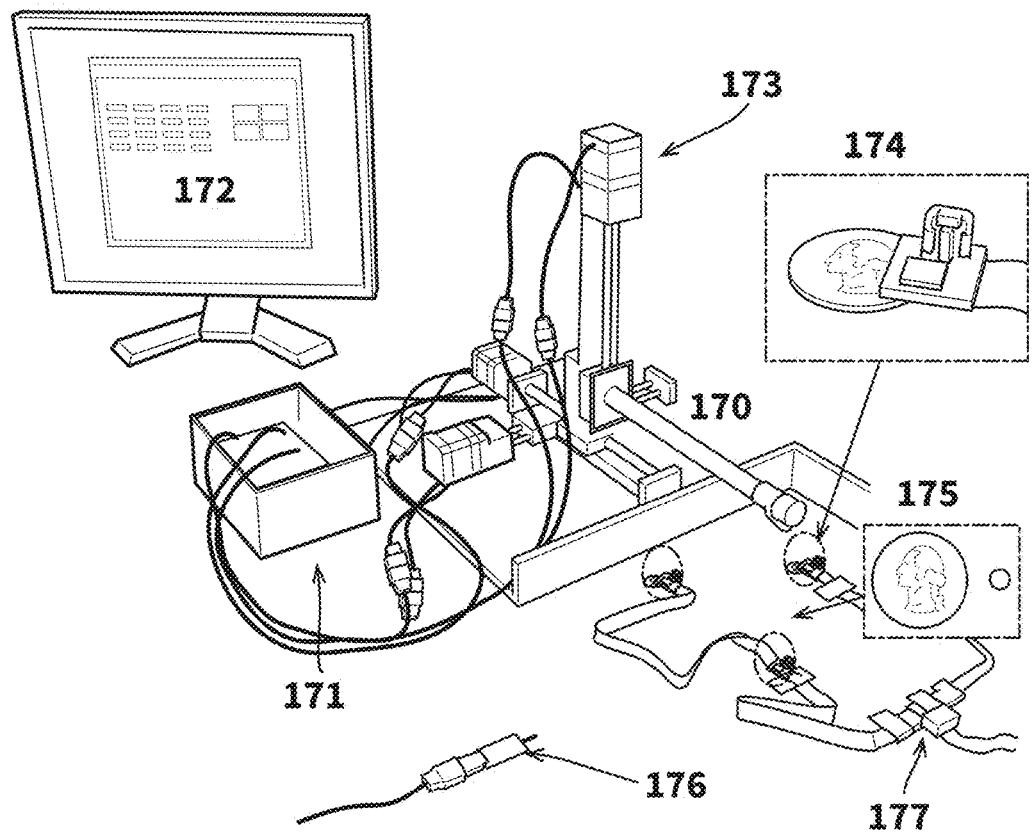
FIG. 16 is a diagram of a high-precision Cartesian robotic arm involved in a second exemplary method of calibrating the TTS system and apparatus according to some embodiments of the present invention.

FIG. 16 is a diagram of a high-precision Cartesian robotic arm 170 involved in a second exemplary method of calibrating the TTS system and apparatus:[10] In this exemplary embodiment of the second calibration method, the magnetic tracer 1 is first attached to the robotic arm 170. Next, the robotic arm 170 can move the tracer unit 1 around the tracking region of interest (ROI). As the magnetic tracer 1 (inset) is moved, a computer can record the precise location of the tracer unit 1 with respect to the magnetic sensors and their magnetic field measurements. After covering a sufficient number of points in the ROI, curve fitting techniques can be applied to fit the recorded magnetic sensor data to the dipole equation at each point on the robotic arm 170's path. This generally allows for high-precision, quantifiable calibration and error measurement. The calibration coefficients extracted from the data can include the magnetometer's gain, offset, and axial misalignment. The robotic arm 170 can also be used to enable verification of the accuracy of the localization algorithm.

The calibration system utilizing the robotic arm 170 can also comprise one or more of a motor-drive USB interface 171, a graphical user interface 172, a 3D positioning system 173, a 3-axis magnetic sensor module 174, a permanent magnet 175, a wireless receiver 176, and/or a control unit 177.

Figure 17:
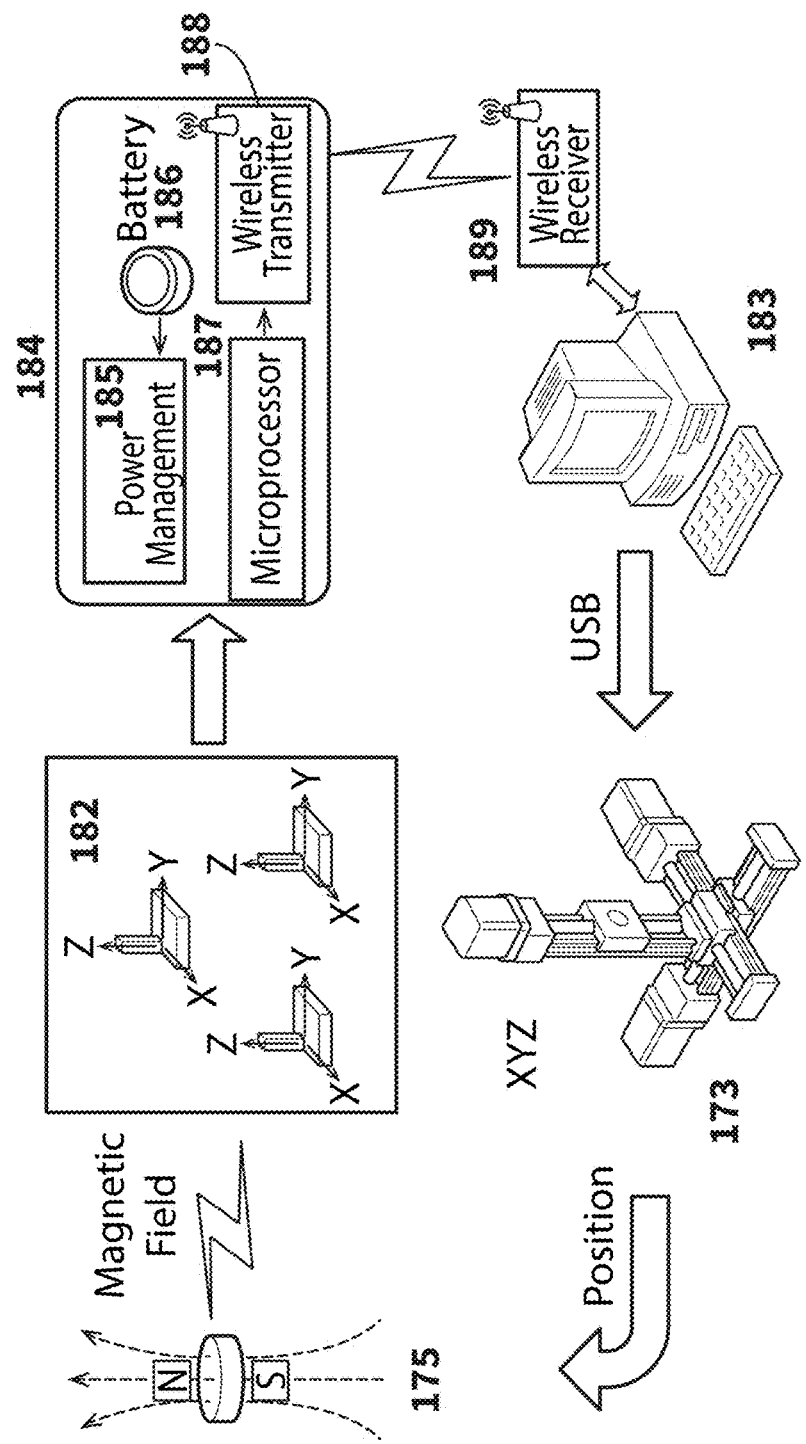
FIG. 17 is a flow diagram of the calibration system using a robotic arm, according to the second exemplary embodiment of calibrating the system and apparatus.

FIG. 17 is a flow diagram of the calibration system using a robotic arm, according to the second exemplary embodiment of calibrating the system and apparatus. In this embodiment of the calibration system, the 3D positioning system 173 can move the permanent magnet 175 of the tracer unit 1 along one or more of three orthogonal axes. The magnetic field sensors 181 can measure the output of the magnetic sensor array 182 and can communicate the measurements back to a computer 183 that can run an SSP algorithm. The computer 183 can then localize the position of the magnetic sensor array 182 and can record the actual and calculated positions and compare them to compute the localization error. This process can be repeated, allowing the creation of arbitrary trajectories and calculating the localization error along those trajectories or mapping the localization error in the entire desired 3D space by sweeping the space with the robotic arm.

The system can also comprise a control unit 184, which can comprise one or more of a power management element 185, a battery 186, a microprocessor 187, and a wireless transmitter 188. The wireless transmitter 188 can communicate with, for example and not limitation, a wireless receiver 189 operably connected to the computer 183. The battery 186 can provide power to the power management element 185. In some embodiments, the microprocessor 187 can provide data or other information to the wireless transmitter 188 for communication to the computer 183 for use with the SSP algorithm.

Figure 18:
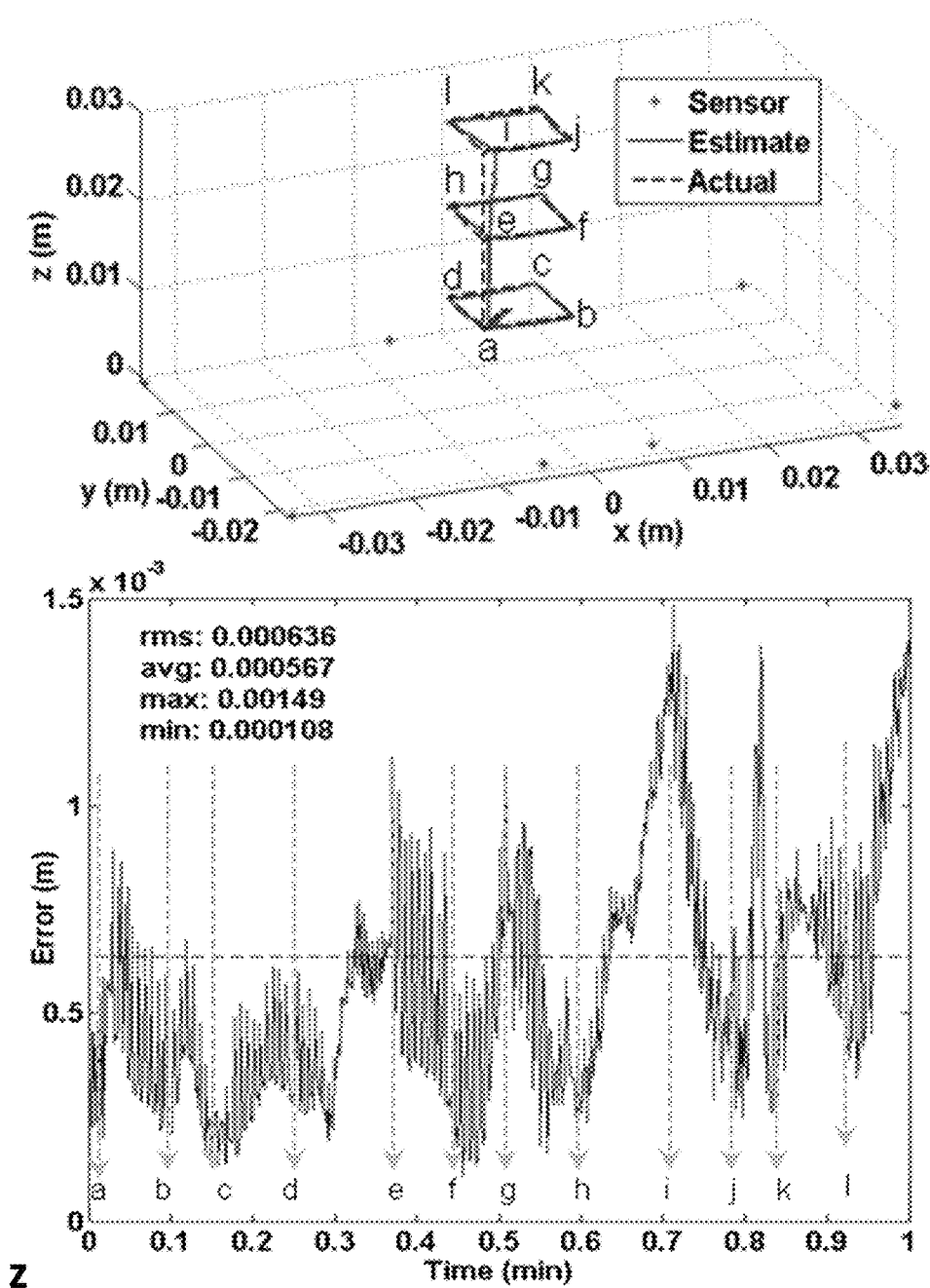
FIG. 18 illustrates an exemplary output from the calibration procedure using the Cartesian robotic arm in FIG. 17.

FIG. 18 illustrates an exemplary output from the calibration procedure using the Cartesian robotic arm in FIG. 17.[10] In the top plot, the dashed line is the actual position of the magnet as it is moved in the 3D space by the robotic arm and the continuous line is the estimate of the magnetic tracer position using a localization and signal processing algorithm embodiment of the TTS system. The bottom plot shows the error in localization over the entire trajectory as the robot moves the magnetic tracer from point a to point b, to point c, all the way to point 1 within 1 minute.

Figure 19:
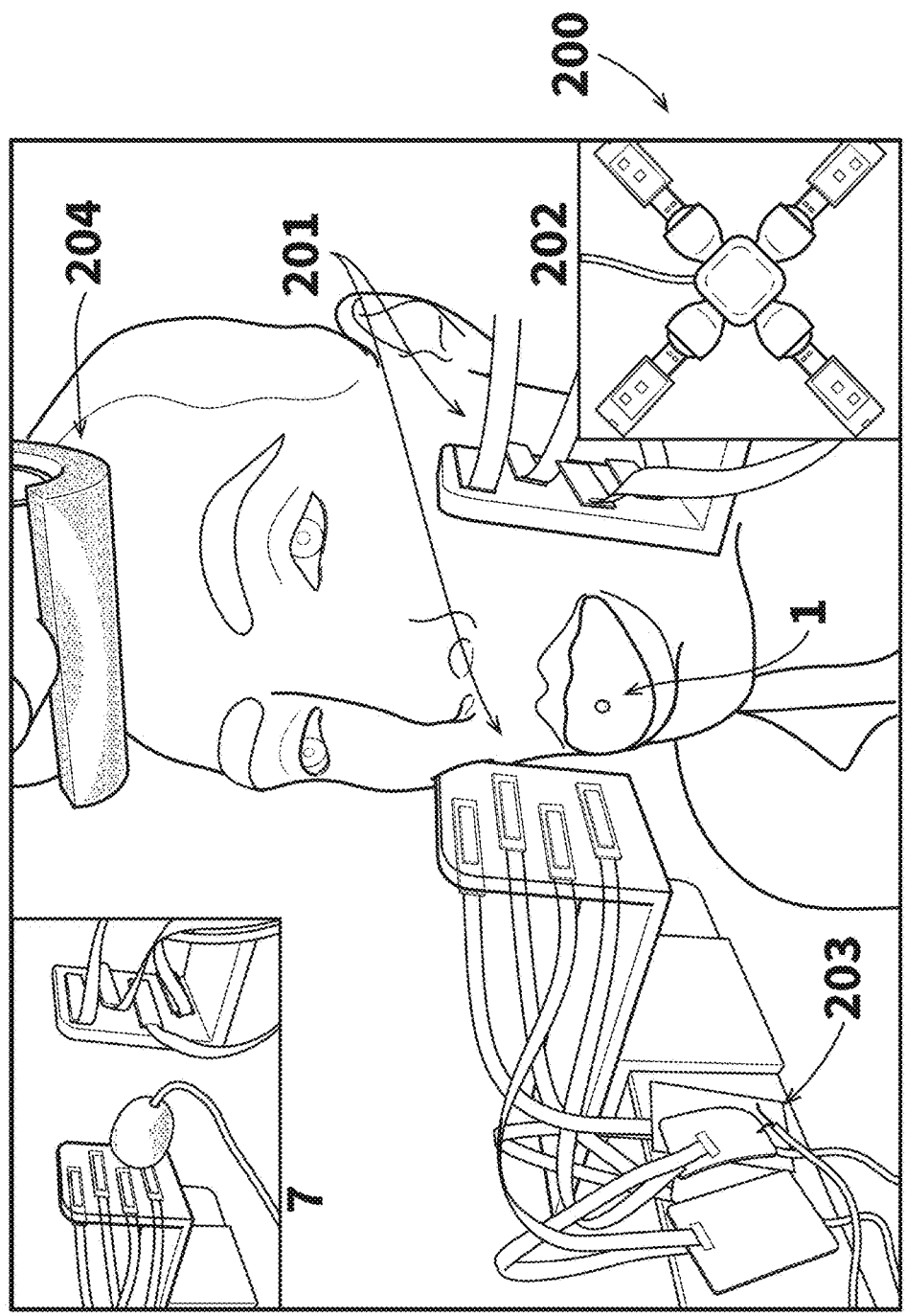
FIG. 19 illustrates an exemplary embodiment of the TTS system and apparatus according to some embodiments of the present invention.

FIG. 19 illustrates an exemplary embodiment 200 of the TTS system and apparatus according to the present invention. In this embodiment, which is one of the first proof-of-concept TTS prototypes, a plurality of sensor control units can be used, each with a plurality of magnetic sensors, for example and not limitation, 3-axis magnetometers 201 (AMI 306, Aichi Steel, Japan), surrounding the mouth to track the movement of tracer unit 1. This embodiment can use a CC2510 SoC (not pictured) to acquire and packetize the magnetic field data and relay it wirelessly to USB receivers 202, which can also be implemented using the CC2510 SoC. In this embodiment, there can be a plurality of USB receivers 202, one for each sensor control unit. A single microphone 7 can be mounted externally in front of the subject's mouth that feeds directly into a computer microphone input. In this embodiment, the user can rest his head against the head support 204 to stabilize the skull and jaw positions while speaking into the magnetic/acoustic sensor array 201. The USB receivers 202 can communicate with the transmitter 203, and the transmitter 203 can communicate with a computing platform 5 (not pictured). The magnetic data can be fused with the speech data by the computing platform 5 in this embodiment.

Figure 20:
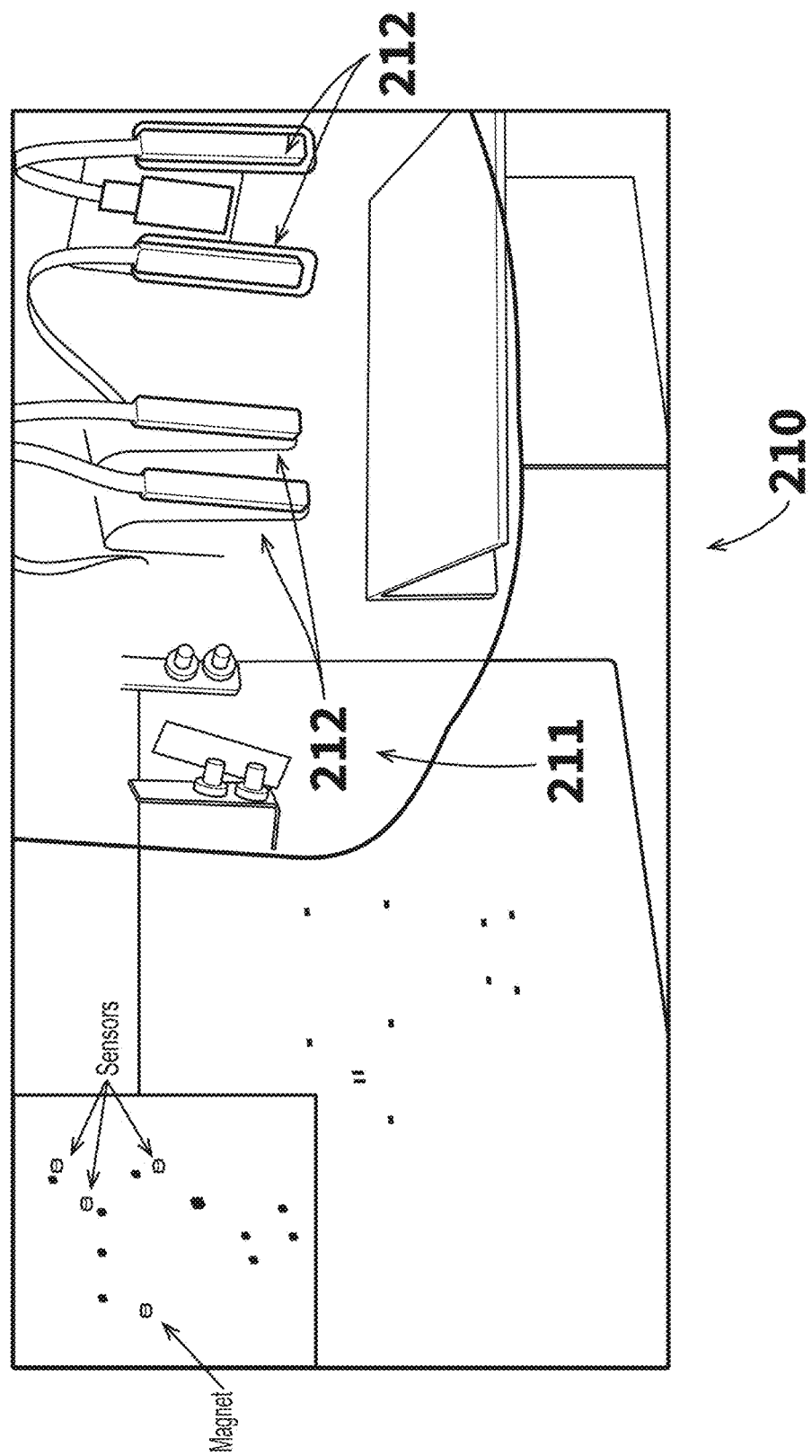
FIG. 20 illustrates another exemplary embodiment of the TTS system and apparatus according to some embodiments of the present invention.

FIG. 20 illustrates another exemplary embodiment 210 of the TTS system and apparatus. In this second exemplary embodiment, a face-shield 211 can be included in the apparatus. The face-shield 211 can incorporate the magnetic sensor units 212 and can hold them in 3D space near the user's mouth. This embodiment can also comprise a visual and/or audiovisual biofeedback presented on a display screen 9, such as for example and not limitation, a computer or television screen or monitor. In this embodiment, the magnetic tracer can be attached to the end of a stick (right), and its location is displayed as a green cylinder (left). The exact positions of the magnetic sensors can be shown on the display screen 9 (not pictured) along with a representation of the magnetic tracer unit 1 to provide depth and location references to the user.

Figure 21:
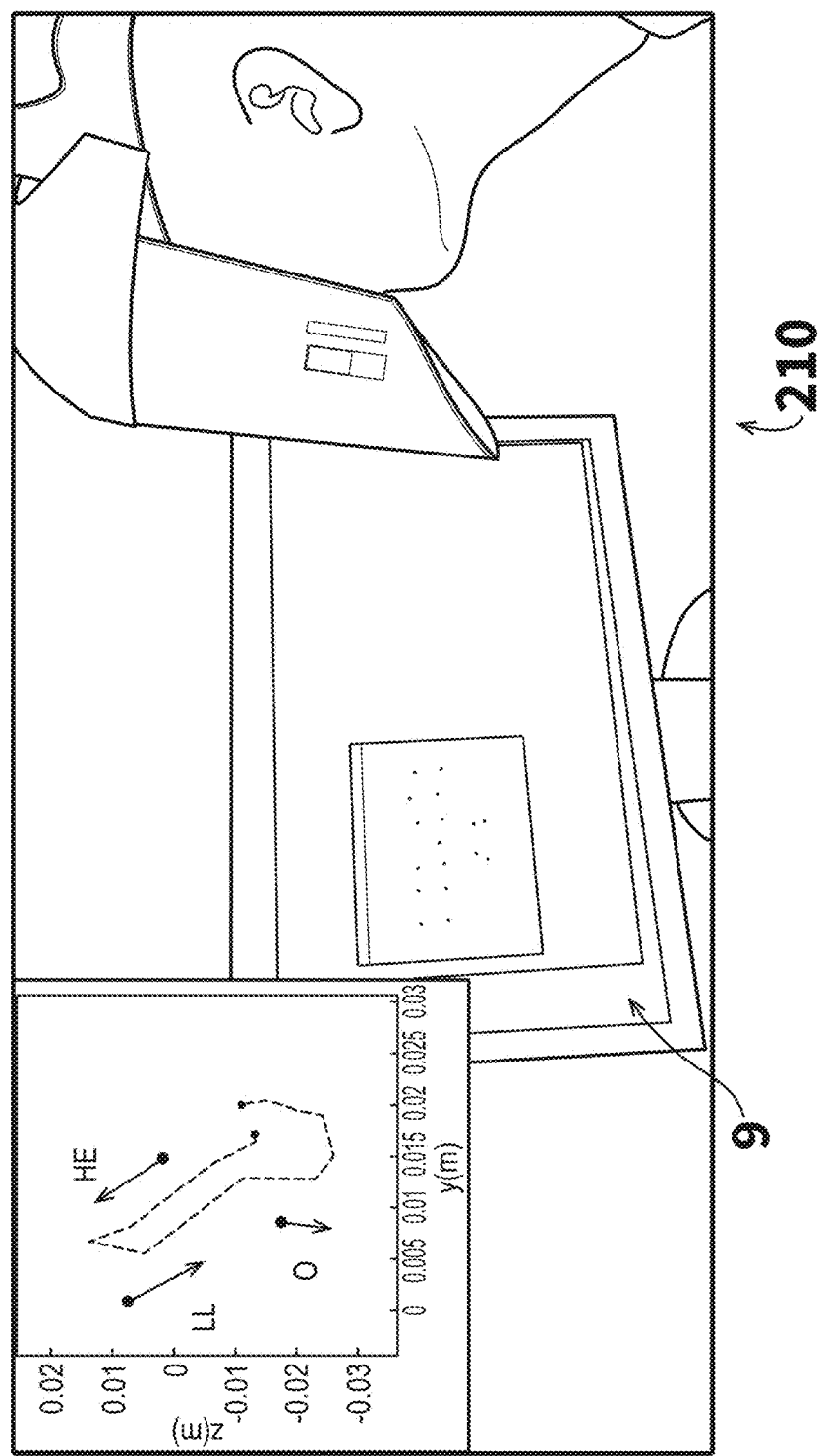
FIG. 21 provides a view of a subject using the exemplary embodiment shown in FIG. 20.

FIG. 21 provides a view of a subject using the exemplary embodiment 210 shown in FIG. 20. Here, the subject is wearing the TTS headset according to this exemplary embodiment and the magnetic tracer 1 is attached to the tip of his tongue (not pictured), while the subject utters the word "Hello". The trajectory of the subject's tongue can be recorded and displayed on the display screen 9, for example as shown in the upper left inset panel.

Figure 22:
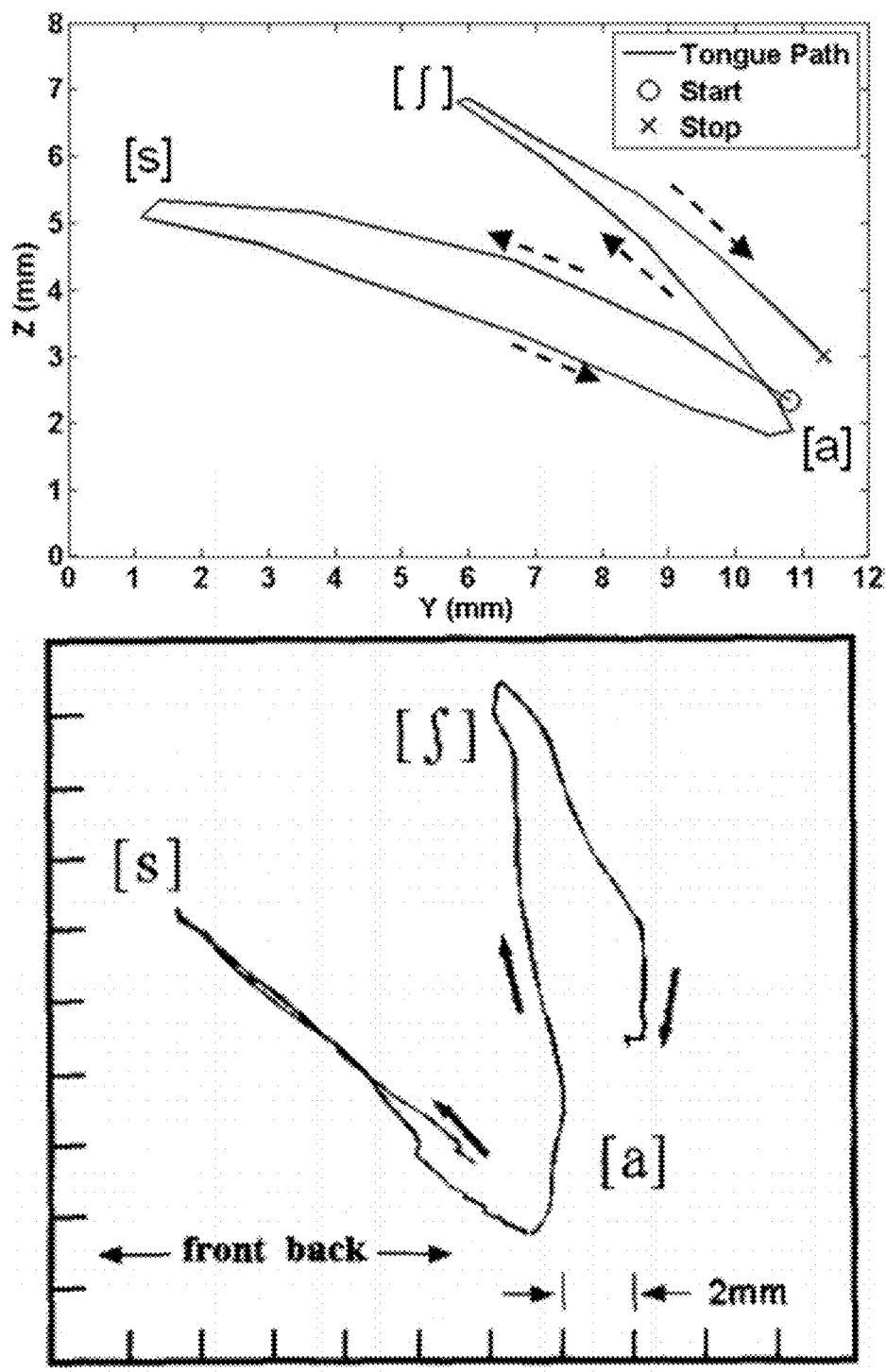
FIG. 22 is a visual display of a phoneme according to some embodiments of the present invention.

FIG. 22 is a visual display of a phoneme according to some embodiments of the present invention. The top panel demonstrates the tongue localization while uttering the phonemes [asa] and [aʃa] using the wireless TTS prototype. The bottom panel provides a comparison with a previously published trace for the same phonemes (Katz et al., 1999).

Figure 23:
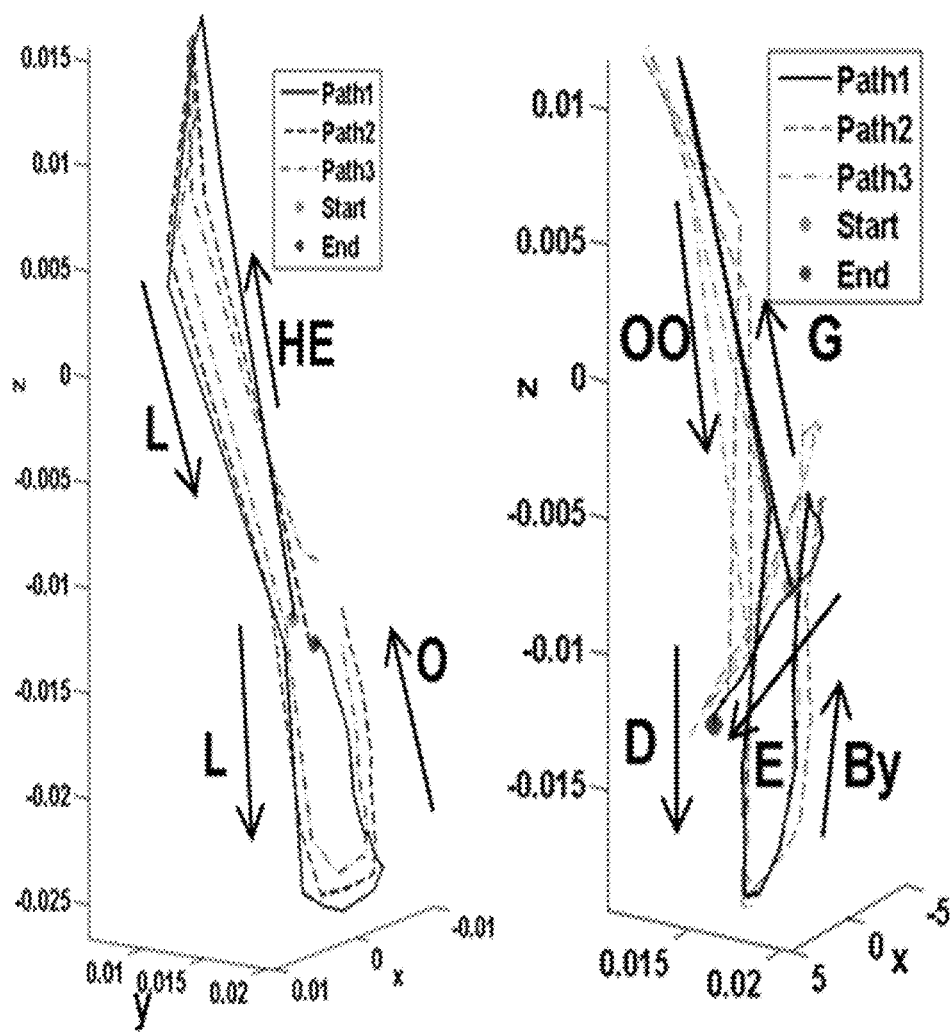
FIG. 23 is a visual display of the words "Hello" and "Goodbye" according to some embodiments of the present invention.

FIG. 23 is a visual display of the words "Hello" and "Goodbye" according to some embodiments of the present invention. Specifically, the display shows 3D localization and output trajectories provided by a TTS system and apparatus according to some embodiments of the present invention for the words "Hello" and "Goodbye" uttered by a single user over three repetitions.

Figure 24:
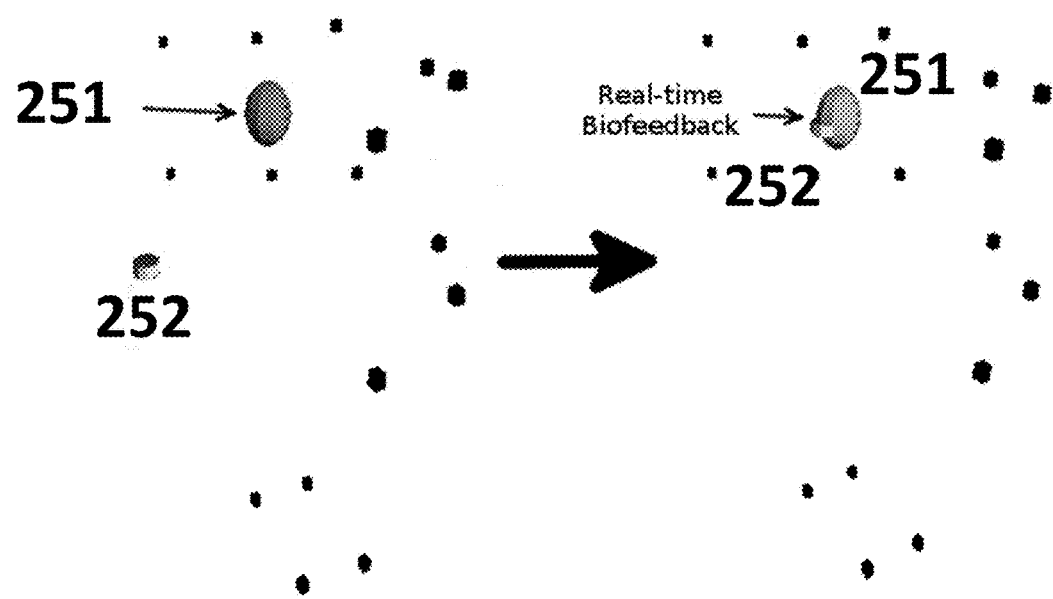
FIG. 24 is a representation of an embodiment of the TTS system in which current biofeedback implementation can be provided to the user during a task that requires the user to move the tracer into a target region.

FIG. 24 is a representation of an embodiment 250 of the TTS system in which current biofeedback implementation can be provided to the user during a task that requires the user to move the tracer into a training and/or target region 251. Correct placement of the tracer unit 252 by the user can be indicated to the user by changing the color of the target region training and/or 251. The target region 251 can then be moved to a new location for continued therapy.

In some of the embodiments described above, the magnet can be a permanent magnet exhibiting straight-line normal demagnetization curve properties. The magnet generates a magnetic field inside the mouth and outside proximal to the face that changes with tongue movements, and thus provides real time information about the tongue position and orientation (i.e., direction) with respect to the lower or upper jaw coordinates (the sensor 12 locations). A permanent magnet that generates the magnetic field can be a small, passive, and inherently wireless component leading to user convenience and requiring no power source or replacement. That is, the sensors 12 can be magnetic sensors and can be activated by a permanent magnet. The system power requirement can be limited to the sensors and the wireless link over a short range (e.g., 2 meters), which can be designed to be low power by time-division-multiplexing (TDM), i.e., turning only one sensor on at any particular time, and other circuit design techniques, as disclosed herein. Therefore, the battery size can be small and its lifetime sufficiently long to reduce burden on the subject.

In some embodiments, the magnet can be a flexible magnet, a rare earth magnet or a ceramic magnet. Exemplary rare earth magnets useful for incorporation within the tracer unit 1 include but are not limited to neodymium iron-boron (NdFeB) magnets and samarium-cobalt (SmCo) magnets. TABLE II lists properties of several exemplary magnets suitable for use with the presently disclosed subject matter.

TABLE II

Characteristics of Materials Used in Permanent Magnets

| Material | $B_r$ (Gauss) | $H_c$ (Oersteds) | $BH_{max}$ (MGOe) |
| --- | --- | --- | --- |
| Flexible | 1,725 | 1,325 | 0.6 |
| Ceramic 1 | 2,200 | 1,900 | 1.1 |
| Ceramic 5 | 3,950 | 2,400 | 3.6 |
| SmCo 18 | 8,600 | 7,200 | 18 |
| SmCo 26 | 10,500 | 9,200 | 26 |
| NdFeB 35 | 12,300 | 11,300 | 35 |
| NdFeB 41 | 13,050 | 12,500 | 41 |
| NdFeB 42 | 13,200 | 12,500 | 42 |
| NdFeB 43 | 13,300 | 12,500 | 43 |
| NdFeB 45 | 13,700 | 12,500 | 45 |
| NdFeB 48 | 14,200 | 12,500 | 48 |
| NdFeB 50 | 14,500 | 12,500 | 50 |
| NdFeB 52 | 14,800 | 12,500 | 52 |

Still referring to FIG. 1, the sensor 12 can in some embodiments comprise an array of sensors. In some embodiments, sensors 12 are magnetic sensors, such as, for example, Hall-effect sensors, magnetoinductive sensors (e.g., MICROMAG™ from PNI Corporation, Santa Rosa, Calif.) and/or magnetoresistive sensors (e.g., serial numbers HMC1303, HMC1512, and HMC6052 available from Honeywell International, Inc., Plymouth, Minn.) when the tracer unit 1 comprises a magnet. Magnetic sensors, which are available in various sizes, such as about 3×2×0.75 mm³ (e.g., Allegro A1391 (Allegro Microsystems, Inc., Worcester, Mass.) micropower 3 V linear Hall-effect sensor with tri-state output and user selectability), can be incorporated in a dental fixture and mounted on posts attached to the outside of the upper and/or lower teeth in the form of an orthodontic brace. Alternatively, soft form-fitting plastic dental fixtures can be used to conform to each subject's oral anatomy, while holding the sensors. The sensors 12 can be stationary with respect to the jaw coordinates and gather information about movements and orientation of the permanent magnet that is attached to the tongue as the tracer unit 1. The sensors 12 convert the magnetic field intensity (B) from the magnet to a proportional analog output voltage. For example, linear Hall-effect sensors convert the magnetic flux density that is vertical to their surface to a proportional voltage, which can be measured as a continuous real-time analog signal output. Therefore, they respond to lateral, distal, and rotational movements of a magnetic tracer unit 1.

In an exemplary embodiment, the battery can be a rechargeable battery that can be charged by a wired or a wireless system. Wired charging of a battery is well known in the art and is as simple as connecting the battery (or its module/apparatus) to a power providing outlet. Over time, the battery charges and then can be reused upon charging.

EXAMPLES

The following non-limiting examples are included to illustrate modes of the presently disclosed subject matter. In light of the present disclosure and the general level of skill in the art, those of skill will appreciate that the following non-limiting examples are intended to be exemplary only and that numerous changes, modifications, and alterations can be employed without departing from the scope of the presently disclosed subject matter.

Example 1

TTS Prototype

Several functional proof-of-concept TTS prototypes have been developed and implemented. More specifically, an embodiment of the present invention comprising a wireless TTS with multiple sensor units and multiple receivers was implemented, which integrates both acoustic and magnetic data. The magnetic data is recorded at 50 Hz using AMI 306 magnetometers from Aichi Steel (Japan). A CC2510 SoC from Texas Instruments (Dallas, Tex.) wirelessly communicates the magnetic data to a receiver, implemented with another CC2510 SoC. The data is transferred to a computer through USB over a virtual COM port. A C++ program collects the data, applies calibration coefficients, and then determines the location of the magnetic tracer using the Nelder-Mead minimization algorithm. After localization of the magnetic tracer, it is displayed on the computer screen. The C++ program also records audio from a mono microphone and records the raw waveform. Several GUI's have been created using the framework and API's of CImg, Qt4, and Qt5. The software is cross-platform and adaptable to multiple computing platforms.

Example 2

Permanent Magnet and Hall-Effect Sensor Experiments

Magnetic Induction (B) and Magnetic Field Strength (H)

The magnetic fields generated by currents and calculated from Ampere's Law or the Biot-Savart Law are characterized by the magnetic field B measured in Tesla. But when the generated fields pass through magnetic materials which themselves contribute internal magnetic fields, ambiguities can arise about what part of the field comes from the external currents and what comes from the material itself. It has been common practice to define another magnetic field quantity, usually called the "magnetic field strength" designated by H. It can be defined by the relationship:

$$H = B_0/N_0 = B/\mu_0 - M \qquad \text{IV}$$

and has the value of unambiguously designating the driving magnetic influence from external currents in a material, independent of the material's magnetic response. The relationship for B can be written in the equivalent form:

$$B = \mu_0(H + M) \qquad \text{V}$$

H and M will have the same units: amperes/meter (SI) or Oersted (CGS). To further distinguish B from H, B is called the magnetic flux density or the magnetic induction. The quantity M in these relationships is called the magnetization of the material.

Another commonly used form for the relationship between B and H is $$B = \mu H \qquad \text{VI}$$

where $$\mu = K_m \mu_0 \qquad \text{VII}$$

$\mu_0$ being the magnetic permeability of space and $K_m$ the relative permeability of the material. If the material does not respond to the external magnetic field by producing any magnetization, then $K_m = 1$.

The B-H Curve

The basis of permanent magnet design is the B-H curve, or hysteresis loop, which characterizes each magnet material. This curve describes the cycling of a magnet in a closed circuit as it is brought to saturation, demagnetized, saturated in the opposite direction, and then demagnetized again under the influence of an external magnetic field.

The second quadrant of the B-H curve, commonly referred to as the "Demagnetization Curve", describes the conditions under which permanent magnets are used in practice. A permanent magnet will have a unique, static operating point if air-gap dimensions are fixed and if any adjacent fields are held constant. Otherwise, the operating point will move about the demagnetization curve, the manner of which must be accounted for in the design of the device.

The three most important characteristics of the B-H curve are the points at which it intersects the B and H axes (at $B_r$—the residual induction—and $H_c$—the coercive force—respectively), and the point at which the product of B and H are at a maximum ($BH_{max}$—the maximum energy product). $B_r$ represents the maximum flux the magnet is able to produce under closed circuit conditions. In actual useful operation permanent magnets can only approach this point. He represents the point at which the magnet becomes demagnetized under the influence of an externally applied magnetic field. $BH_{max}$ represents the point at which the product of B and H, and the energy density of the magnetic field into the air gap surrounding the magnet, is at a maximum. The higher this product, the smaller need be the volume of the magnet. Designs should also account for the variation of the B-H curve with temperature.

When plotting a B-H curve, the value of B is obtained by measuring the total flux in the magnet ($\Phi$) and then dividing this by the magnet pole area (A) to obtain the flux density ($B = \Phi/A$). The total flux is composed of the flux produced in the magnet by the magnetizing field (H), and the intrinsic ability of the magnet material to produce more flux due to the orientation of the domains. The flux density of the magnet is therefore composed of two components, one equal to the applied H, and the other created by the intrinsic ability of ferromagnetic materials to produce flux. The intrinsic flux density is given by the symbol $B_i$ where total flux $B = H + B_i$, or, $B_i = B - H$. In normal operating conditions, no external magnetizing field is present, and the magnet operates in the second quadrant, where H has a negative value. Although strictly negative, H is usually referred to as a positive number, and therefore, in normal practice, $B_i=B+H$. It is possible to plot an intrinsic as well as a normal B-H curve.

One Dimensional Measurements of Magnetic Field Strength

The strength of a magnetic field drops off exponentially over distance. For magnetic materials with straight-line normal demagnetization curves such as rare earth magnets and ceramics it is possible to calculate with reasonable accuracy the flux density at a distance X from the pole surface (where X>0) on the magnet's centerline under a variety of conditions.

For a cylindrical or disc shaped magnet with a radius of R and Length L, the magnetic induction at the centerline of the magnet a distance X from the surface can be calculated by the following formula, where Br is the Residual Induction of the material In order to verify the theory as given by the above equation with experimental results, a wooden apparatus was constructed with the Hall-effect sensor attached to one wooden stand and the magnet to another, as disclosed in EXAMPLE 1. Using this setup, the Hall Sensor was fixed in position and the magnet was shifted at different distances from the sensor, along a straight line. The permanent magnet used was a Single 1/8" rare earth magnet (model 641895 from RadioShack) which exemplary specifications are summarized in TABLE II. The Hall-effect sensors used were from Melexis (Concord, N.H.) with 21 mV/G and 9 mV/G sensitivities and from Allegro Microsystems with 1.31 mV/G sensitivity. For all 3 sensors, the experimental results, shown in FIGS. 7A-7C, matched theoretical predictions with reasonable accuracy.

Two Dimensional Measurements of Magnetic Field Strength

The same apparatus utilized in the 1D measurements and disclosed in EXAMPLE 1 was used to characterize the magnetic field of a permanent magnet in a plain (2D). The utility of these experiments was to predict and observe trends of the magnetic induction, B, variations with respect to relative sensor and permanent magnet positions. When both sensor and magnet are located perpendicular to a 2D plain, B changes with x, y, and (I), which are distance along X axis, distance along Y axis, and relative orientation of the sensor and magnet, respectively. Since no simple closed form equation for magnetic field in 2D when sensor and magnet dimensions are comparable to their relative distance is available, the experimental data was compared with the results from the FEMLAB® Magnetostatics Modeling module (Comsol Inc., Stockholm, Sweden). FEMLAB® is an interactive environment to model single and coupled phenomena based on partial differential equations (PDE).

In all of the following experiments, the position of the sensor was kept constant and the magnet was moved with respect to the sensor while measuring the sensor output voltage, which is monotonically related to B according to the 1D experiments disclosed herein. Then the magnet positions which resulted in constant sensor output voltage (constant B) where connected to one another to create a set of isopotential curves. A FEMLAB® 2D model comparable to the RadioShack 64-1895 1/8" rare earth magnet specification was also constructed, which included the following parameters:

1. Magnet Length=1.2 mm
2. Magnet Height=4.7 mm
3. Magnet Material Relative Permeability=5000 (assumed)
4. Magnet Residual. Induction=Br=10800 Gauss

REFERENCES

[1] S. Borthwick, "Communication impairment in patients following stroke," Nursing standard, vol. 26, no. 19, pp. 35-41, 2012.

[2] B. Cornett, D. Ross, L. Harmon, G. Bebb and P. Ford, "The Speech-Language Pathology Medical Review Guidelines," American Speech-Language-Hearing Association (ASHA), 2011.

[3] B. Denby, T. Schultz, K. Honda, T. Hueber, J. Gilbert and J. Brumberg, "Silent speech interfaces," Speech Communication, vol. 52, no. 4, pp. 270-287, 2010.

[4] M. Fagan, S. Ell, J. Gilbert, E. Sarrazin and P. Chapman, "Development of a (silent) speech recognition system for patients following laryngectomy," Medical Engineering & Physics, vol. 30, no. 4, pp. 419-425, 2008.

[5] W. Katz, S. Bharadwaj and B. Carstens, "Electromagnetic Articulography Treatment for an Adult with Broca's Aphasia and Apraxia of Speech," Journal of Speech, Language & Hearing Research, vol. 42, no. 6, pp. 1355-1366, 1999.

[6] T. Hueber, E. Benaroya, G. Chollet, B. Denby, G. Dreyfus and M. Stone, "Development of a silent speech interface driven by ultrasound and optical images of the tongue and lips," Speech Communication, vol. 52, no. 4, pp. 288-300, 2010.

[7] T. Hirahara, M. Otani, S. Shimizu, T. Toda, K. Nakamura, Y. Nakajima and K. Shikano, "Silent-speech enhancement using body-conducted vocal-tract resonance signals," Speech Communication, vol. 52, no. 4, pp. 301-313, 2010.

[8] T. Quatieri, K. Brady, D. Messing, J. Campbell, W. Campbell, M. Brandstein, C. Weinstein, J. Tardelli and P. Gatewood, "Exploiting Nonacoustic Sensors for Speech Encoding," IEEE Trans. Speech Audio Process., vol. 14, no. 2, pp. 533-544, 2006.

[9] M. Ghovanloo, "Tongue operated assistive technologies," in IEEE 29th Eng. in Med. and Bio. Conf., Lyon, France, 2007.

[10] A. Farajidavar, J. Block and M. Ghovanloo, "A comprehensive method for magnetic sensor calibration: A precise system for 3D tracking of the tongue movements," in Engineering in Medicine and Biology Society (EMBC), 2012 Annual International Conference of the IEEE, San Francisco, 2012.

[11] "Speech and Language Disorders and Diseases," 2013. [Online] Available: http://www.asha.org/public/speech/disorders/default.htm. [Accessed February 2013].

Numerous characteristics and advantages have been set forth in the foregoing description, together with details of structure and function. While the invention has been disclosed in several forms, it will be apparent to those skilled in the art that many modifications, additions, and deletions, especially in matters of shape, size, and arrangement of parts, can be made therein without departing from the spirit and scope of the invention and its equivalents as set forth in the following claims. Therefore, other modifications or embodiments as may be suggested by the teachings herein are particularly reserved as they fall within the breadth and scope of the claims here appended.

What is claimed is:

1. A system for real-time tracking of at least one of a position, orientation, and movement of a tongue of a user during speech comprising:

a tracer unit;

magnetic sensors;

a speech characteristic sensor;

a sensor control unit;

a computing platform; and a feedback system;

wherein the tracer unit is adapted to be non-obstructively affixed at a location on the tongue of the user;

wherein the magnetic sensors are configurable to measure a magnetic flux density at the location of the tracer unit, the magnetic sensors in non-obstructive proximity to the tracer unit and mouth of the user;

wherein the speech characteristic sensor configurable to detect a speech characteristic selected from the group consisting of sound produced by the user, an air flow produced by the user, a lip movement/gesture produced by the user, a physical contact between the tongue and a palate of the user, an articulator muscle movement produced by the user, and an electrical activity of a brain of the user;

wherein the sensor control unit is configurable to:
receive a magnetic sensor signal from a magnetic sensors;
receive a speech characteristic sensor signal from the speech characteristic sensor;
synchronize the magnetic sensor signal with the speech characteristic sensor signal; and
transmit the synchronized sensor signal to the computing platform;

wherein the computing platform is configurable to:
perform a tongue tracking signal processing algorithm, the algorithm including minimizing a cost function that correlates to the measured magnetic flux density and an estimated magnetic flux density at the location of the tracer unit, the location of the tracer unit being defined within a three-dimensinal, non-discrete space;
determine, based on the algorithm, one or more of a position, orientation, and movement of the tracer unit in real time within the three-dimensinal, non-discrete space;
generate a combination of the one or more determined position, determined orientation, and determined movement of the tracer unit with the speech characteristic sensor signal; and
transmit the combination to the feedback system; and wherein the feedback system is configurable to provide assistive speech-related feedback to the user in real time, based on the combination, wherein the assistive speech-related feedback is selected from the group consisting of a representation of temporally and spatially continuous tracking of the user's tongue movement during speech of a target phoneme within the three-dimensional non-discrete space, an interactive game to quantify and monitor the user's progress, and vibrotactile biofeedback comparing speech of the user to correct speech of a target phoneme.

2. The system of claim 1, the tracer unit comprising a magnet.

3. The system of claim 1, the magnetic sensors adapted to be placed within the mouth of the user.

4. The system of claim 1, the magnetic sensors adapted for positioning outside the mouth of the user.

5. The system of claim 1, the speech characteristic sensor comprising at least one of a microphone, a camera, an air pressure sensor, an air flow sensor, an electrode array adapted for electromyography of the user's oral articulator muscles, an electrode array adapted for electropalatography, and an electrode array adapted for electroencephalography.

6. The system of claim 1 further comprising a remote display distal the user.

7. The system of claim 6, wherein the remote display is capable of being used by a remote user selected from the group consisting of a speech therapist, a speech and language pathologist, a clinician, a tutor, a parent, a caretaker, a physician, and an insurance agent.

8. The system of claim 1, wherein the assistive speech-related feedback further includes an audio recording corresponding to the processed signals and related data.

9. The system of claim 1, the controller unit comprising a high-speed field programmable gate array.

10. An assistive method of providing information useful in improving a user's speech based on real-time tracking at least one of a position, orientation, and movement of a tongue of the user during speech comprising:
receiving magnetic sensor signals from magnetic sensors;
measuring, based on the magnetic sensor signals, a magnetic flux density at a location of a tracer unit, the tracer unit being located in a non-obstructive manner on the tongue of the user;
performing a tongue tracking signal processing algorithm, the algorithm including minimizing a cost function that correlates to the measured magnetic flux density and an estimated magnetic flux density at the location of the tracer unit, the location of the tracer unit being defined within a three-dimensinal, non-discrete space;
determining, based on the algorithm, one or more of a position, orientation, and movement of the tracer unit in real time within the three-dimensinal, non-discrete space;
receiving speech characteristic signals from speech characteristic sensors;
combining the one or more determined position, determined orientation, and determined movement of the tracer unit with the speech characteristic sensor signals; and
generating, based on the combining, assistive speech-related feedback data, the assistive speech-related feedback data representing temporally and spatially continuous tracking of the user's tongue movement in real time.

11. The method according to claim 10, wherein the plurality of speech characteristic sensors are configured to sense two or more from the group consisting of a sound produced by the user, an air flow produced by the user, a lip movement produced by the user, a lip gesture produced by the user, a physical contact between the tongue and a palate of the user, a muscle movement produced by the user, and an electrical activity of a brain of the user.

12. The method according to claim 10 further comprising displaying a representation of the assistive speech-related feedback data, wherein the representation is one or both of vibrotactile biofeedback and an interactive game.

13. The method according to claim 10 further comprising:
cataloging assisitive speech-related feedback data into a library for use as a silent speech interface, wherein the assisitive speech-related feedback data correspond to at least one of a word and a phrase.

14. The system of claim 1, wherein the sensor control unit is incorporated into a headset comprising a head support, a processor, a receiver configurable to receive sensor signals from the magnetic sensors and the speech characteristic sensor, and a wireless transmitter configurable to be in wireless communication with the control unit.

15. The method according to claim 10, wherein measuring the magnetic flux density comprises amplification, filtering, digitization, magnetic localization, smoothing, and pattern recognition of the magnetic sensor signals.

16. The method according to claim 12, wherein the assisitaive speech-related feedback data is generated according to the steps of showing the raw magnetic sensor outputs;

generating a fused combination of at least one sensor output comprising output from at least one magnetic and acoustic sensor; calculating a vector sum representation of the magnetic sensor outputs; producing a change of color based on the pitch or amplitude of the speech volume based on output from the acoustic sensors; and showing the tongue trajectory in at least one of 1D, 2D, or 3D, an interactive game, and a goal-oriented game.

* * * * *